US008601479B2

(12) United States Patent
Iyengar et al.

(10) Patent No.: US 8,601,479 B2
(45) Date of Patent: Dec. 3, 2013

(54) SYSTEMS AND METHODS FOR MULTI-LEG TRANSACTION PROCESSING

(75) Inventors: Arun K. Iyengar, Yorktown Heights, NY (US); Gong Su, New York, NY (US); Yanqi Wang, Beijing (CN); Yu Yuan, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 12/567,845

(22) Filed: Sep. 28, 2009

(65) Prior Publication Data

US 2011/0078685 A1 Mar. 31, 2011

(51) Int. Cl.
*G06F 9/46* (2006.01)
*G06Q 10/00* (2012.01)

(52) U.S. Cl.
USPC .......................... 718/102; 705/7.26; 705/7.27

(58) Field of Classification Search
USPC .......................................................... 718/101
See application file for complete search history.

(56) References Cited

U.S. PATENT DOCUMENTS

| | | | | |
|---|---|---|---|---|
| 6,189,017 | B1 | 2/2001 | Ronstrom et al. | |
| 7,333,952 | B1 | 2/2008 | Neyman et al. | |
| 7,898,679 | B2 * | 3/2011 | Brack et al. | 358/1.15 |
| 2003/0167224 | A1 | 9/2003 | Periwal | |
| 2007/0174175 | A1 | 7/2007 | Brucato | |
| 2008/0077521 | A1 | 3/2008 | Sibley et al. | |
| 2008/0177652 | A1 | 7/2008 | Weiss | |
| 2008/0228633 | A1 | 9/2008 | Kalt | |
| 2008/0255880 | A1 | 10/2008 | Beller et al. | |
| 2008/0255982 | A1 | 10/2008 | Hughes et al. | |
| 2008/0270321 | A1 | 10/2008 | Nordlicht et al. | |
| 2009/0037910 | A1 * | 2/2009 | Dantzig et al. | 718/100 |
| 2009/0037913 | A1 | 2/2009 | Dantzig et al. | |
| 2009/0271308 | A1 * | 10/2009 | Maynard | 705/37 |

OTHER PUBLICATIONS

"FIX Order Routing Protocol", International Securities Exchange, Inc., Print Date: Jul. 10, 2009.

* cited by examiner

*Primary Examiner* — Abdullah Al Kawsar
*Assistant Examiner* — Wissam Rashid
(74) *Attorney, Agent, or Firm* — Ference & Associates LLC

(57) ABSTRACT

Embodiments of the invention broadly contemplate systems, methods and arrangements for processing multi-leg transactions. Embodiments of the invention process multi-leg transactions while allowing later arrived orders to get processed during the time when an earlier, tradable multi-leg transaction is pending using a look-ahead mechanism without violating any relevant timing or exchange rules.

23 Claims, 25 Drawing Sheets

| | |
|---|---|
| 01 | Sell 3 shares of stock A @ $100 |
| 02 | **Buy 2 shares of stock A @ $101 (M)** |
| 03 | Buy 1 shares of stock A @ $102 |
| 04 | Buy 1 shares of stock A @ $101 |
| 05 | Buy 2 shares of stock A @ 102 |
| 06 | Sell 1 shares of stock A @ $99 |
| 07 | Sell 4 shares of stock A @ $100 |
| 08 | Buy 1 shares of stock A @ $102 |

SYSTEMS AND METHODS FOR MULTI-LEG TRANSACTION PROCESSING

BACKGROUND

Multi-leg transactions (for example multi-leg stock trades) allow for the submission of multiple, dependent transaction requests (for example stock buy/sell orders) in a consolidated order that will be executed atomically as a single transaction. One example of two-leg order is to "buy 200 shares of stock A" AND "sell 300 shares of stock B", which is executed if and only if both legs of the two-leg order can be executed.

BRIEF SUMMARY

Embodiments of the invention broadly contemplate systems, methods and arrangements for processing multi-leg transactions such that the amount of blocking incurred therewith is reduced. Various embodiments of the invention provide a considerable improvement in the throughput of systems handling multi-leg transactions. Embodiments of the invention enable the use of a multi-leg trading method that, among other advantages, works well with the primary-primary high availability (HA) paradigm; allows later arrived orders to get processed during the time when an earlier, tradable multi-leg order has sent out a query and is waiting for the reply; allows orders arriving later but getting processed earlier to not impair the tradability of an earlier arriving but blocked multi-leg order, and ensures all single-leg orders conform to the "first-come-first-serve" rule.

In summary, one aspect of the invention provides a method comprising: utilizing one or more processors to execute program instructions configured to: look-ahead in a queue of transaction requests to identify one or more resolving transaction requests from transaction requests queued after one or more multi-leg transaction requests; and in response to identifying the one or more resolving transaction requests, process one or more blocked transaction requests during a waiting period of the one or more multi-leg transaction requests without losing a match for the one or more multi-leg transaction requests.

Another aspect of the invention provides a system comprising: one or more modules comprising one or more processors configured to execute program instructions, the program instructions comprising computer readable program code configured to: look-ahead in the queue to identify one or more resolving transaction requests from transaction requests queued after the one or more multi-leg transaction requests; and in response to identifying the one or more resolving transaction requests, process one or more blocked transaction requests during a waiting period of the one or more multi-leg transaction requests without losing a match for the one or more multi-leg transaction requests.

A further aspect of the invention provides a computer program product comprising a computer readable storage medium having computer readable program code embodied therewith, the computer readable program code being configured to: look-ahead in a queue to identify one or more resolving transaction requests from transaction requests queued after the one or more multi-leg transaction requests; and in response to identifying the one or more resolving transaction requests, process one or more blocked transaction requests during a waiting period of the one or more multi-leg transaction requests without losing a match for the one or more multi-leg transaction requests.

A still further aspect of the invention provides a method for handling buy and sell orders of different types comprising: utilizing one or more processors to execute program instructions configured to: receive a plurality of buy and sell orders comprised of at least one multi-leg order for multiple types; receive an order for a multi-leg order m1 for type A and type B wherein m1 can trade for type A but has not yet been cleared for type B; and handle at least one order for type A received after m1 using a lookahead algorithm.

For a better understanding of embodiments of the present invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
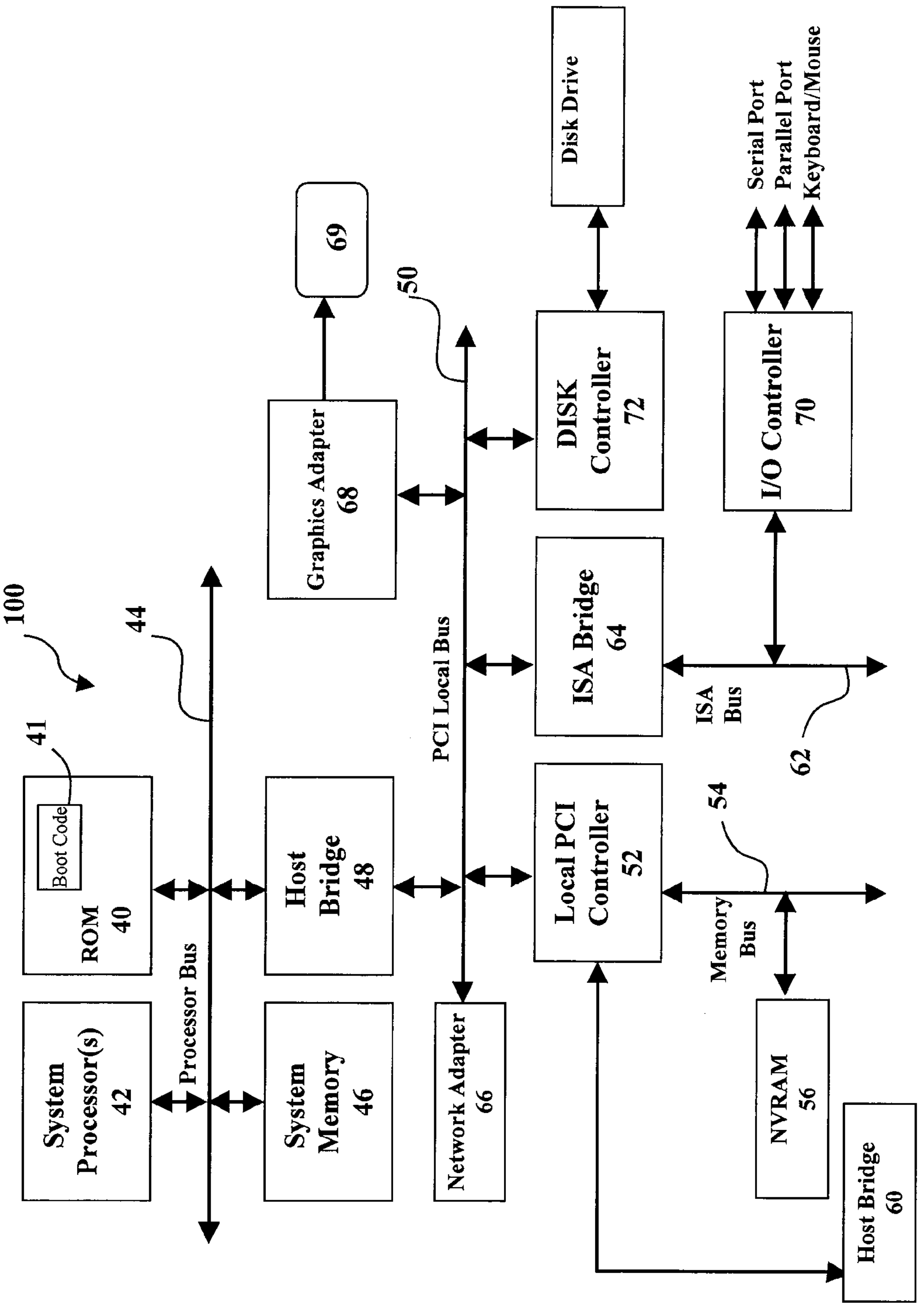
FIG. 1 illustrates an exemplary computer system according to an embodiment of the invention.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the claims but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the figures/drawings. The following description is intended only by way of example, and simply illustrates certain selected presently preferred embodiments of the invention as claimed herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the following disclosure in large part focuses on discussion of embodiments of the invention as implemented in the context of electronic stock trading involving multi-leg transactions. It will be readily understood by those having ordinary skill in the relevant art, however, that various embodiments of the invention are applicable to a wide variety of contexts involving transaction processing in which excess blocking/locking as a result of compound transactions is harmful to performance, including but not limited to publish/subscribe systems, online auctions, on-line stores generally and the like.

Multi-leg transactions used in stock trading offer considerably more power over conventional stock trading. However, the inventors have recognized that implementing multi-leg trading efficiently in an electronic environment is difficult.

Embodiments of the invention provide solutions to significant limitations for successfully completing multi-leg transactions posed by conventional arrangements. The inventors have recognized that existing electronic stock and commodity exchanges do not support multi-leg trades in a purely automated fashion, and only a few support the primary-primary HA paradigm. Bundle trading, proposed in early 1990s, appears to be a similar concept; however all existing research around bundle trading focuses on how to model the matching problem to maximize the market surplus by using mathematical optimization approaches. The inventors have recognized that with the popularity of modern distributed stock exchange architecture, which uses multiple Execution Venues (EVs), with each EV responsible for a number of stocks, the matching problem doesn't exist any more. Nonetheless, the inventors have recognized that the distributed architecture introduces significant communication and synchronization overhead, particularly for multi-leg trading.

Similarly, the inventors have recognized that in existing electronic auction sites do not support automated multi-leg transactions. For example using EBAY, multi-leg trading, for example to buying a DVD of "Movie X" and a computer DVD-ROM of "Movie X" altogether (where if one cannot get both, one would does not want either of them), will be a very time-consuming burden for customers. One has to submit separate orders for each item and track the progress of all orders submitted. This amounts to manual tracking and monitoring of the orders.

The inventors have also recognized that on-line stores do not support automated multi-leg transactions. First, a key difference between an on-line store and electronic auction/exchange is the fact that Business to Consumer (B2C) market has significantly less complexity and less communication/synchronization overhead compared with Consumer to Consumer (C2C) market. Moreover, in current on-line stores, for example AMAZON.COM, if one wants to buy the DVD and the DVDROM atomically, one has to search for each item from different web pages, although payment is centralized; however, as will become apparent, this is quite different than the multi-leg trading concepts discussed herein.

In traditional transaction processing, there is a 2-phase commit protocol and a 3-phase commit protocol, which are designed for distributed sites to achieve consensus in a cooperative way. However, the inventors have recognized that neither of these protocols allows processing of incoming transactions before the previous transaction commits or aborts. The inventors have recognized that what is needed is a unique protocol/method to allow continual processing of later (arrived) transactions even though one or more earlier transactions have not yet reached commit/abort, without breaking any timing rules (for example stock trading/exchange rules). Particularly, embodiments of the invention as described herein work well with primary-primary HA paradigm, which in part and among other features, distinguishes various embodiments of the invention from other transaction processing optimization techniques.

The inventors have recognized that one of the key problems introduced by multi-leg trading is the amount of locking that is introduced. In a typical multi-leg exchange, there will be multiple execution venues and each execution venue will handle a number of stocks. Therefore, the processing of a multi-leg request might require communication among several different execution venues. In addition, only one transaction per stock may be processed at a time to preserve the first-come-first-serve rule, which means an order can only get processed after a previous multi-leg order gets processed completely. Thus, the throughput of the exchange will decrease significantly due to introduction of multi-leg trading. The inventors have recognized that this is one of the key problems preventing electronic multi-leg trading from being widely adopted.

Meanwhile, due to the strict high availability requirement for stock trading, embodiments of the invention are compatible with existing HA paradigms. Most existing stock exchanges only support primary-secondary (also called hot back-up) HA paradigm, while primary-primary is a more promising paradigm due to its significantly lower fail-over time. Accordingly, embodiments of the invention are also configured to work well with the primary-primary HA paradigm.

As is understood, a multi-leg order finds a match in the book, then sends a query to partner site, and a wait for reply about whether other legs can trade is needed. If other legs cannot trade, the multi-leg order cannot trade. In any event, the multi-leg transaction cannot be completed until all legs are completed, which leads to blocking of subsequent/later arriving orders.

According to embodiments of the invention, therefore, instead of locking processing and blocking there, the execution venue continues to look ahead in the queue to find the next order and detect dependency (type) of the order. If the order is a conflicting order, then it is preferable to do nothing but still look ahead in the queue to check the next order. If the order is a non-conflicting order, embodiments of the invention propose the order to a centralized coordinator and process the non-conflicting order, and then look ahead in the queue and check the next order. If the order is a resolving order, then embodiments of the invention atomically propose all conflicting orders that the resolving order resolves to the coordinator as a block, and, if accepted by the coordinator, then process each order in the block one by one, in order, and looks ahead in the queue to check the next order. Otherwise, the execution venue will receive from the coordinator an order sequence for several following orders, shuffle the order according to the sequence, and then look ahead in the queue to check the next order.

According to various embodiments of the invention, advantages over conventional arrangements include but are not limited to allowing all trading rules to hold utilizing new approaches, significantly increasing throughput (30%~150% for different multi-leg percentages) by eliminating long pauses brought with the multi-leg trading pause, and improving latency by eliminating long pauses brought with the multi-leg trading pause.

The description now turns to the figures and certain select and non-limiting presently preferred embodiments of the invention will be described in further detail.

Referring now to FIG. 1, there is depicted a block diagram of an illustrative embodiment of a computer system 100. The illustrative embodiment depicted in FIG. 1 may be an electronic device such as a desktop or workstation computer. As is apparent from the description, however, the embodiments of the invention may be implemented in any appropriately configured electronic device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces electronic device 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60. Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, and the like. A disk controller 72 connects a disk drive with PCI local bus 50. The USB Bus and USB Controller (not shown) are part of the Local PCI controller (52).

Figure 2:
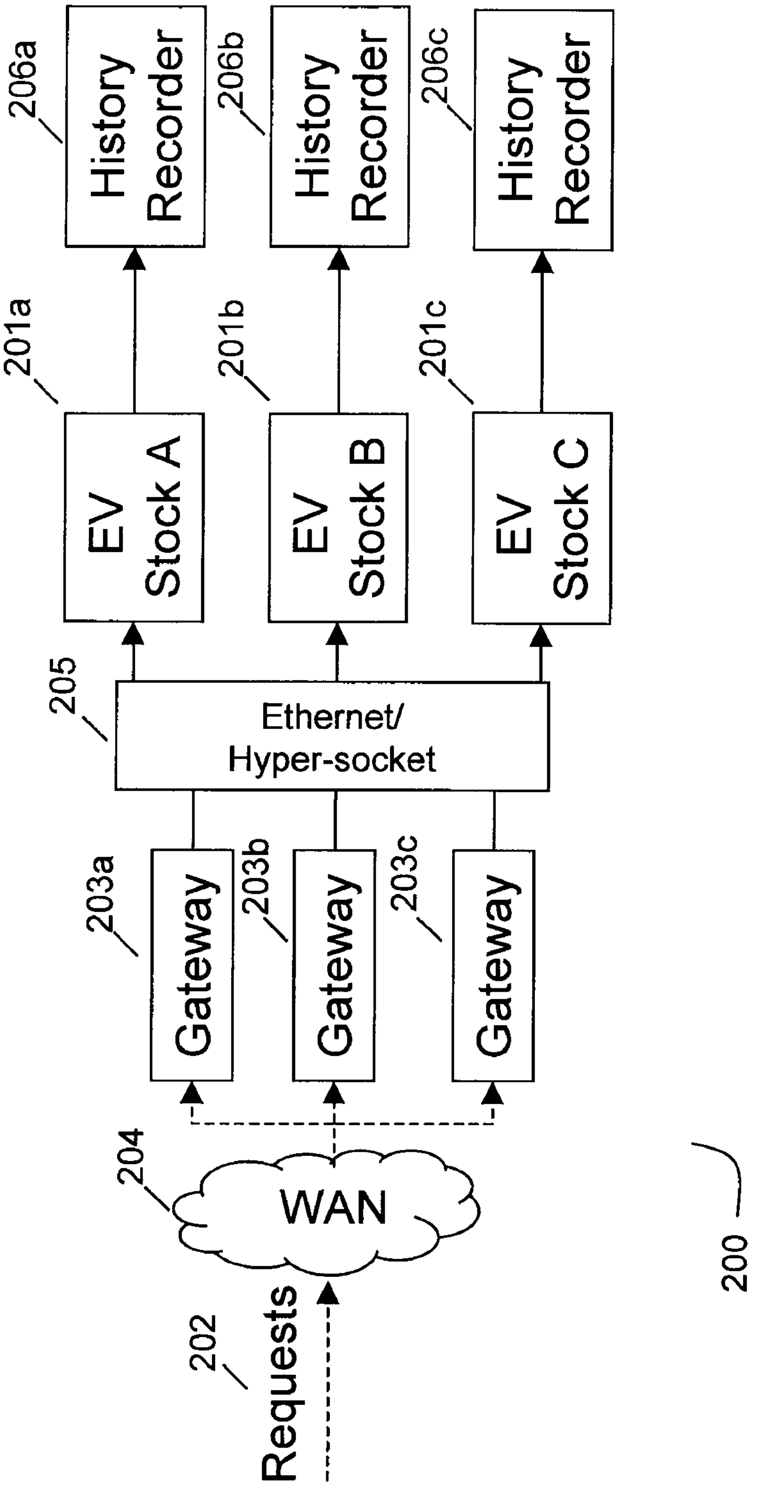
FIG. 2 illustrates an exemplary overview of a multi-leg transaction system according to one embodiment of the invention.

FIG. 2 illustrates a non-limiting and exemplary transaction processing system 200 according to one embodiment of the invention. A transaction processing system 200 according to embodiments of the invention may be implemented using a computer system, such as computer system 100. As shown the illustrative transacting processing system 200 includes a plurality of processing nodes (in this example exchange venues (EV) 201*a*, 201*b*, 201*c*, et cetera), wherein for the purposes of this example, each processing node process a type of stock, in this example stocks A, B and C. Requests 202 (for example buy/sell requests/orders) are received via one or more gateways 203*a*, 203*b*, 203*c*, et cetera, via a suitable connection, for example WAN 204. The gateways 203*a*, 203*b*, 203*c* process and forward the requests 202 to the appropriate EV via a suitable connection, for example Ethernet/Hyper-socket 205. The EVs forward information regarding the transaction legs to one or more history recorders 206*a*, 206*b*, 206*c* et cetera.

According to embodiments of the invention there are preferably system constraints in place, as described further herein, pursuant to the particular context in which the system is to be implemented. As used in this non-limiting and exemplary description relating to embodiments providing multi-leg stock trading using look-ahead mechanisms, the following constraints apply.

As a first constraint, the first-come-first-trade rule for all orders is adhered to. The trading policies of the appropriate exchange are strictly enforced among all single-leg orders. An order that offers a better price is traded earlier than other single-leg orders. For orders offering the same price, the order that comes in earlier is traded earlier than other single-leg orders.

As a second constraint, the trading policies of the appropriate exchange are strictly enforced among all multi-leg orders. An order that offers a better price gets its reply earlier than other multi-leg orders get their queries sent. An order that comes earlier gets its reply earlier than other multi-leg orders get their queries sent.

As a third constraint, the trading policies of the appropriate exchange are enforced among all single-leg orders and multi-leg orders. A single-leg order is traded before any multi-leg orders that offer a "worse" price get their queries sent out. For orders offering the same price, a single-leg order gets traded before any multi-leg orders (that come later) get their queries sent out. Finally, for multi-leg orders that have already sent out queries, any single-leg order that comes later should NOT cause the multi-leg orders to loose matches until the multi-leg orders get replies.

As an optional constraint, a first-come-first-handled rule for all single-leg orders is adhered to. The action of being handled includes for example the following situations: 1) the order being inserted into the order book; and 2) the order getting traded. In this context, earlier orders get handled prior to any later orders.

The following non-limiting and exemplary use cases are presented herein for illustrating certain aspects of the invention. In the first case ("Case 1"), the optional constraint, discussed above regarding the first-come-first-handled rule, is NOT taken into consideration. The following definitions are presented for use in understanding multi-leg transaction processing according to an embodiment of the invention in Case 1:

1. Conflicting Order: this is an order that has a match in the system, but if it gets traded, it will cause a blocked multi-leg order to not be tradable (an order which shares all or part of the same match with a blocked multi-leg order).

2. Non-conflicting Order: this is an order that does not have any match in the system (an order that will not affect any part of a blocked multi-leg order).

3. Resolving Order: this is an order that can satisfy a blocked multi-leg order, so that if one or more conflicting orders proceed, the blocked multi-leg order can still find its match.

Figure 3:
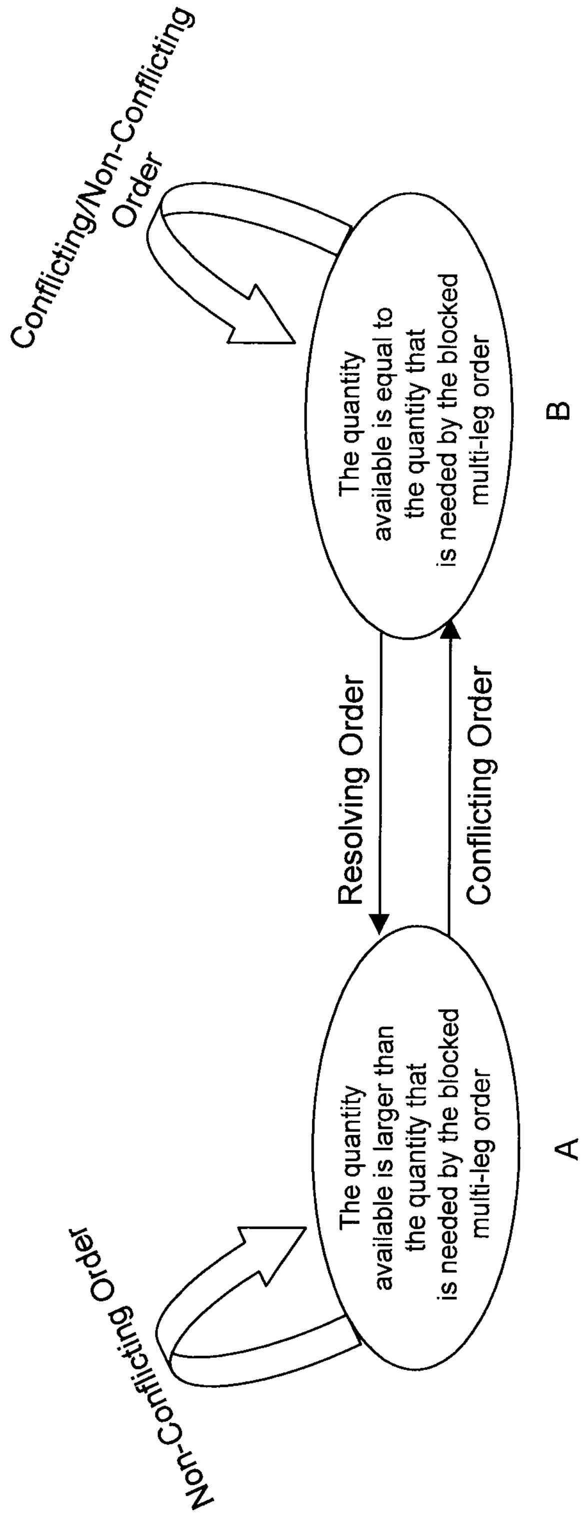
FIG. 3 illustrates a state machine for an exemplary Case 1 of multi-leg transaction processing according to an embodiment of the invention.

FIG. 3 illustrates a state machine for Case 1. As shown, there are two general states of concern, A and B. In state A, the quantity of stock available is larger than the quantity of stock that is needed by a blocked multi-leg order, thus no blocking is occurring. In state B, the quantity of stock available is equal to the quantity of stock that is needed by the blocked multi-leg order. In Case 1, only the multi-leg order's requirements must be preserved in order to continue look-ahead processing of later arrived orders.

Figure 4:
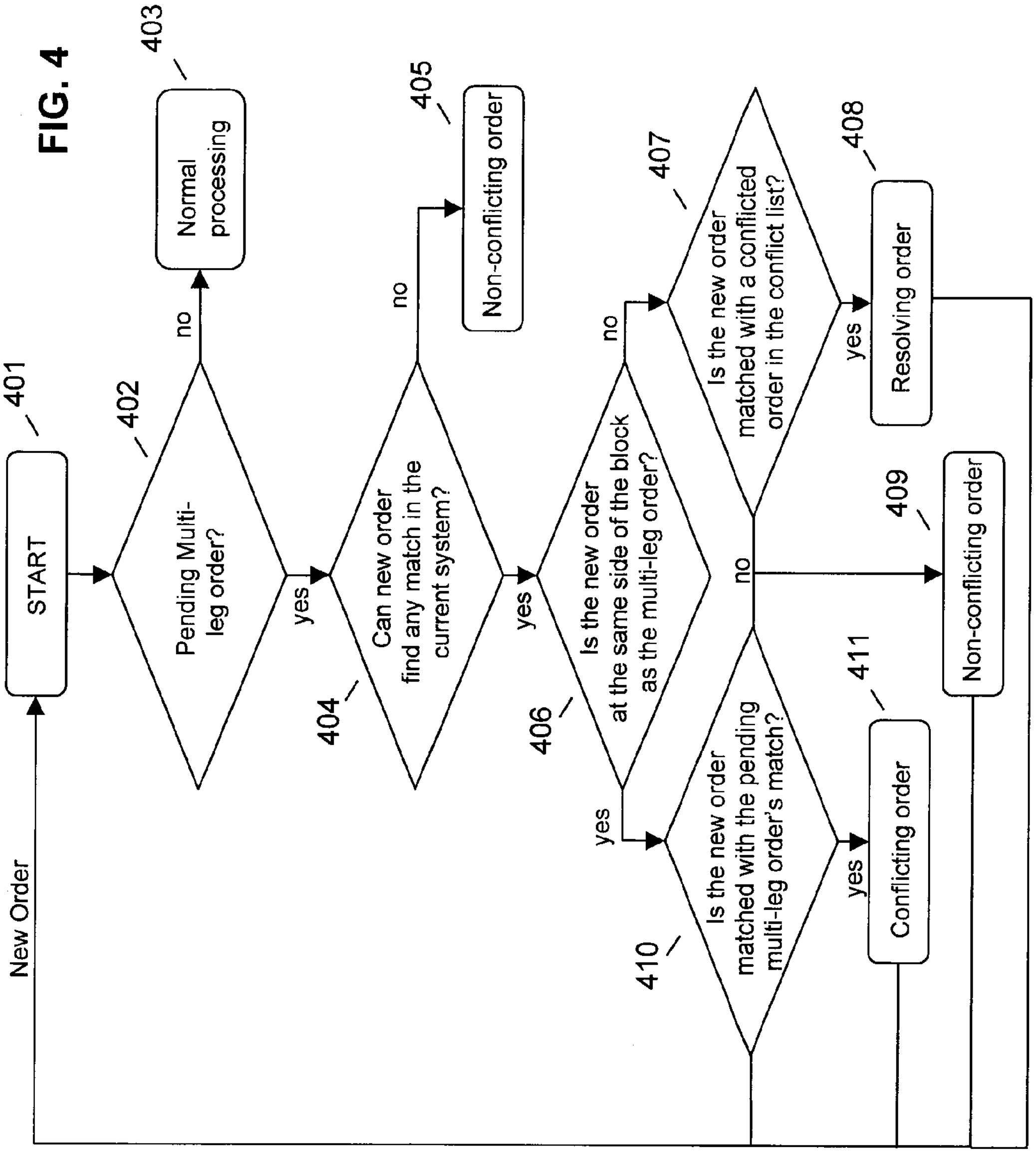
FIG. 4 illustrates an exemplary method for detecting/determining order types in Case 1 according to an embodiment of the invention.

FIG. 4 illustrates a non-limiting and exemplary method for multi-leg transaction processing for Case 1 according to an embodiment of the invention. The process starts at 401 when a new order is received. First, a determination is made at 402 as to whether there is a pending multi-leg order. The pending multi-leg order can create a block in the processing of the new order. If there is no pending multi-leg order, the process ends at 403, as no block/conflict is possible with the new order. However, if at 402 it is determined that there is a pending multi-leg order, it is determined if the new order can find any match (to complete the new order) in the current system at 404. If not, the order is determined to be non-conflicting at 405 and is processed. The order is non-conflicting because it is not matched to any other order in the current system.

However, if at 404 it is determined that the new order can find a match in the current system, it is determined at 406 if the new order is at the same side of the block as the multi-leg order (creating a potential conflict for the new order). If the new order is not at the same side as the block, it is determined at 407 if the new order is matched with a conflicted order (for example an earlier order in a conflict list). If so, the order is determined at 408 to be a resolving order (removing the conflicting order via a match) and is processed with the order (s) it resolves. If the new order does not match with a conflicted order, the order is determined at 409 to be a non-conflicting order and is processed.

If the new order is determined at 406 to be at the same side of the block as the pending multi-leg order, it is determined at 410 if the new order is matched with the pending multi-leg order's match. If yes, the order is determined to be a conflicting order at 411 and is held. If the new order is not matched with the pending multi-leg order's match, it is determined to be a non-conflicting order at 409 and is processed. The process continues as such upon receipt of each new order. It should be noted that conflicting orders are held by the system until a resolving order is received.

FIG. 5(A-K) provides a non-limiting example for handling Case 1 multi-leg transactions. Referring to FIG. 5A, in a first step, the system receives an order 01: "Sell 3 shares of stock A at price $100", which is inserted into a queue 520. The orders (01-08) are placed into the queue 520 on receipt. An arrow indicator at the queue 520 is used to orient the current processing steps with respect to the queued order(s). Transactions in progress 510*a* and the trading result 510*b* are segmented for purposes of illustration.

Figure 5A:
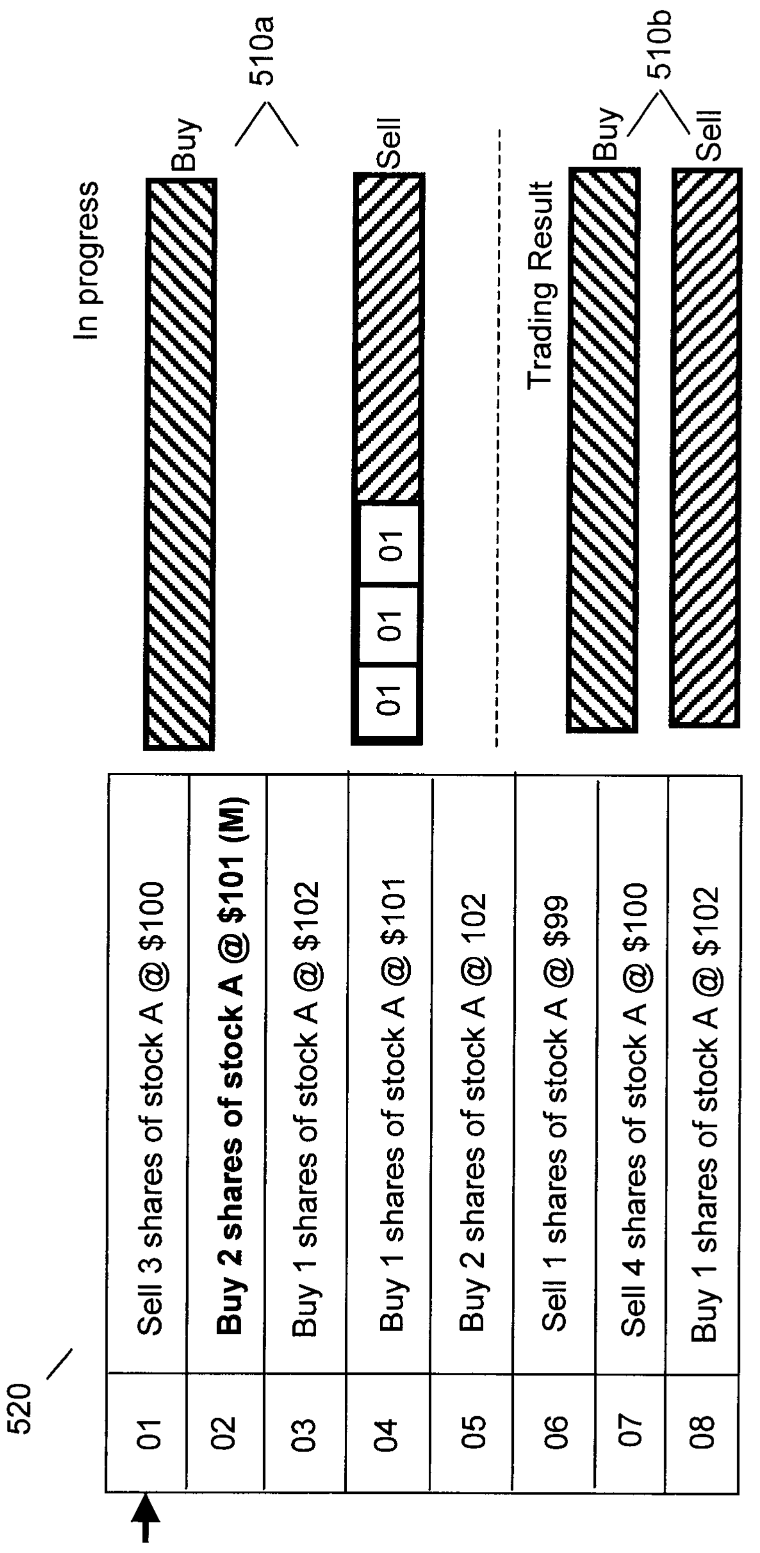
FIG. 5(A-K) illustrates an exemplary processing of transactions under Case 1 according to an embodiment of the invention.
Figure 5B:
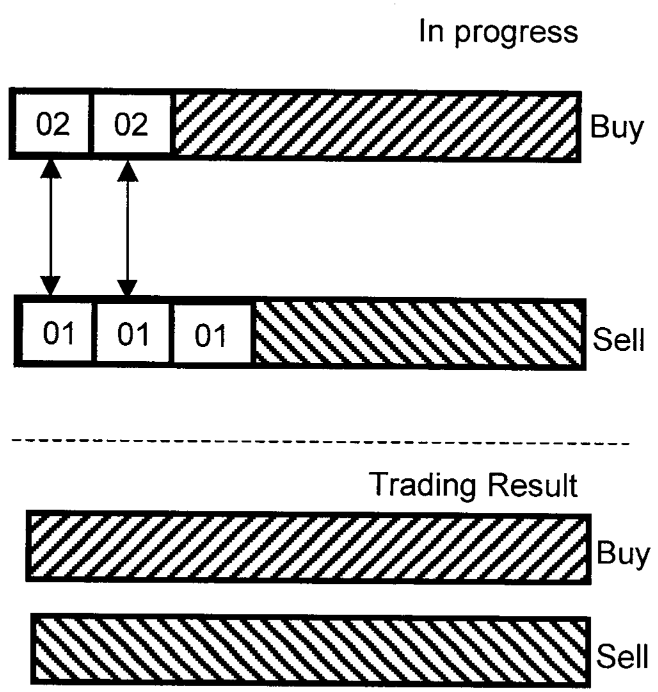

Turning now to FIG. 5B, in a second step the system receives a multi-leg order 02: "Buy 2 shares of stock A at $101 AND Sell 3 shares of stock B at $50". It should be noted that the second leg of the multi-leg order is not illustrated (that is, the leg requesting "Sell 3 shares of stock B at $50" and it is assumed for this example that the second leg must be handled by another execution venue and that the response is pending during the look-ahead mechanism. The first leg of the order, that is "Buy 2 shares of stock A at $101" can match with order 01 and a query is sent to the execution venue for processing the request to sell 3 shares of stock B. Because there is now a pending multi-leg request (that is order 02 is waiting to hear back from the execution venue regarding stock B), blocking can occur, leading to system delay in handling subsequent orders. Hence, embodiments of the invention employ a look-ahead mechanism to process later arriving orders without losing a match for the first leg of the multi-leg order 02.

Figure 5C:
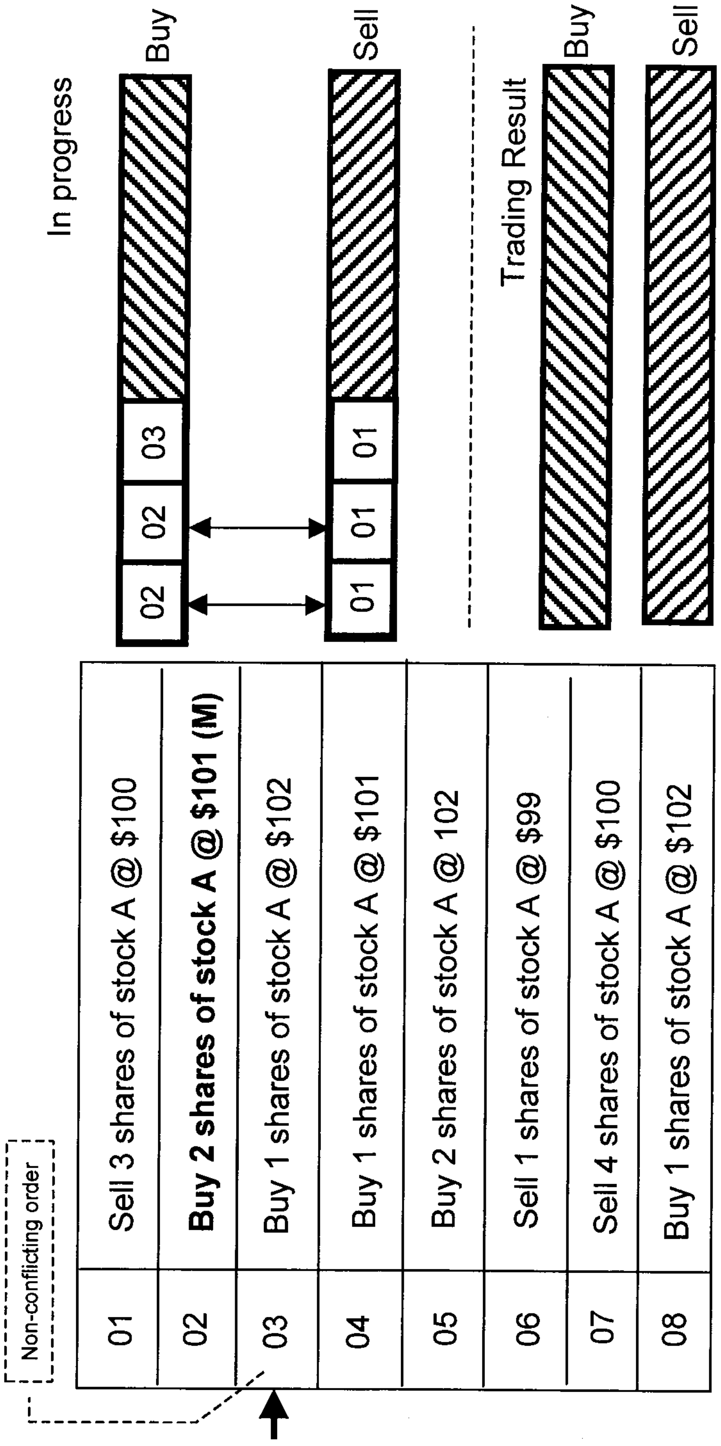
Figure 5D:
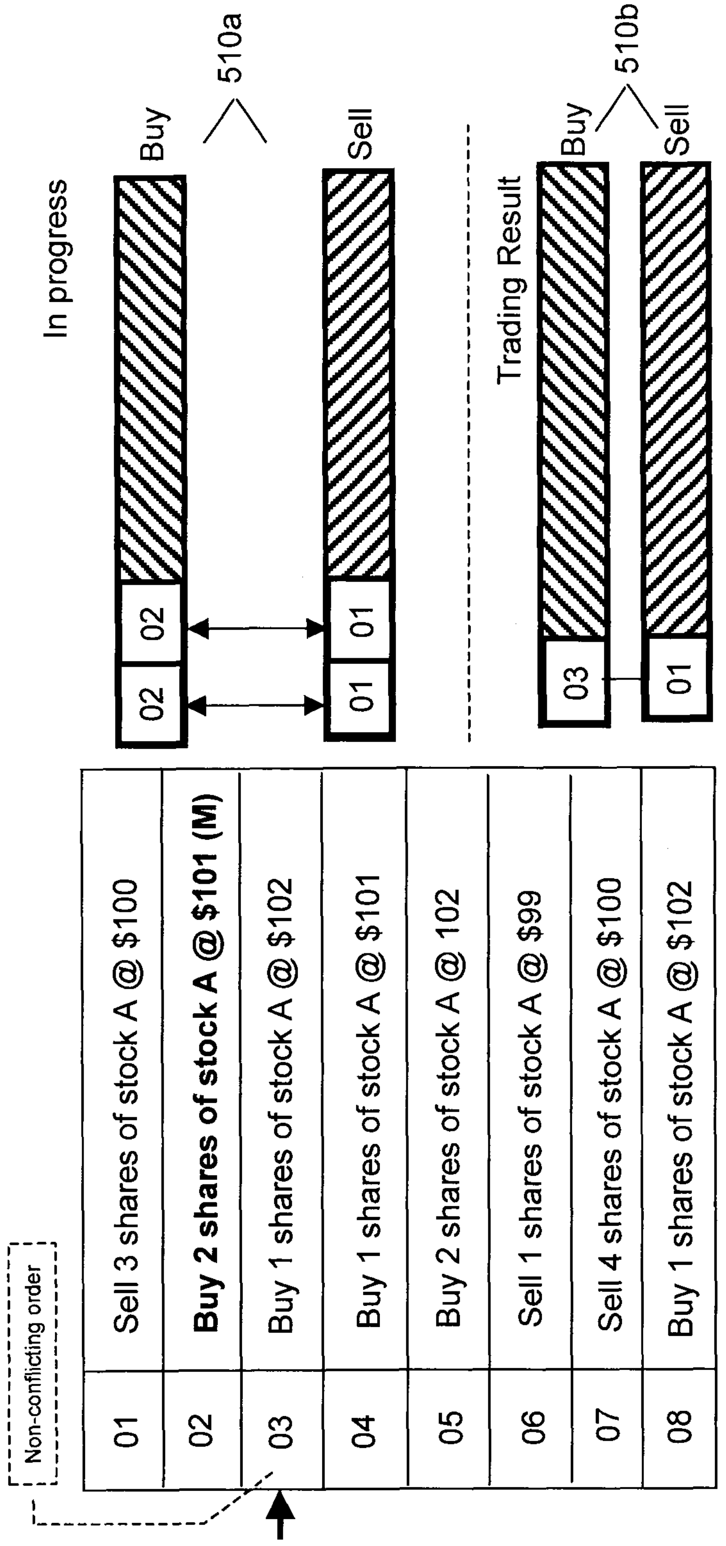

Referring now to FIG. 5C-D, a single-leg order 03: "Buy 1 share of stock A at $102" is received at the system. Order 03 can match with order 01 without affecting order 02. Thus, 03 and 01 get traded. This is acceptable, as in this case 03 is handled after 01 and 02 is still pending and has not lost any match (that is, order 03 does not conflict with order 02). As shown in FIG. 5D, order 03 and 01 have been processed, and so are removed from in progress 510*a* and placed in the trading result 510*b*.

Figure 5E:
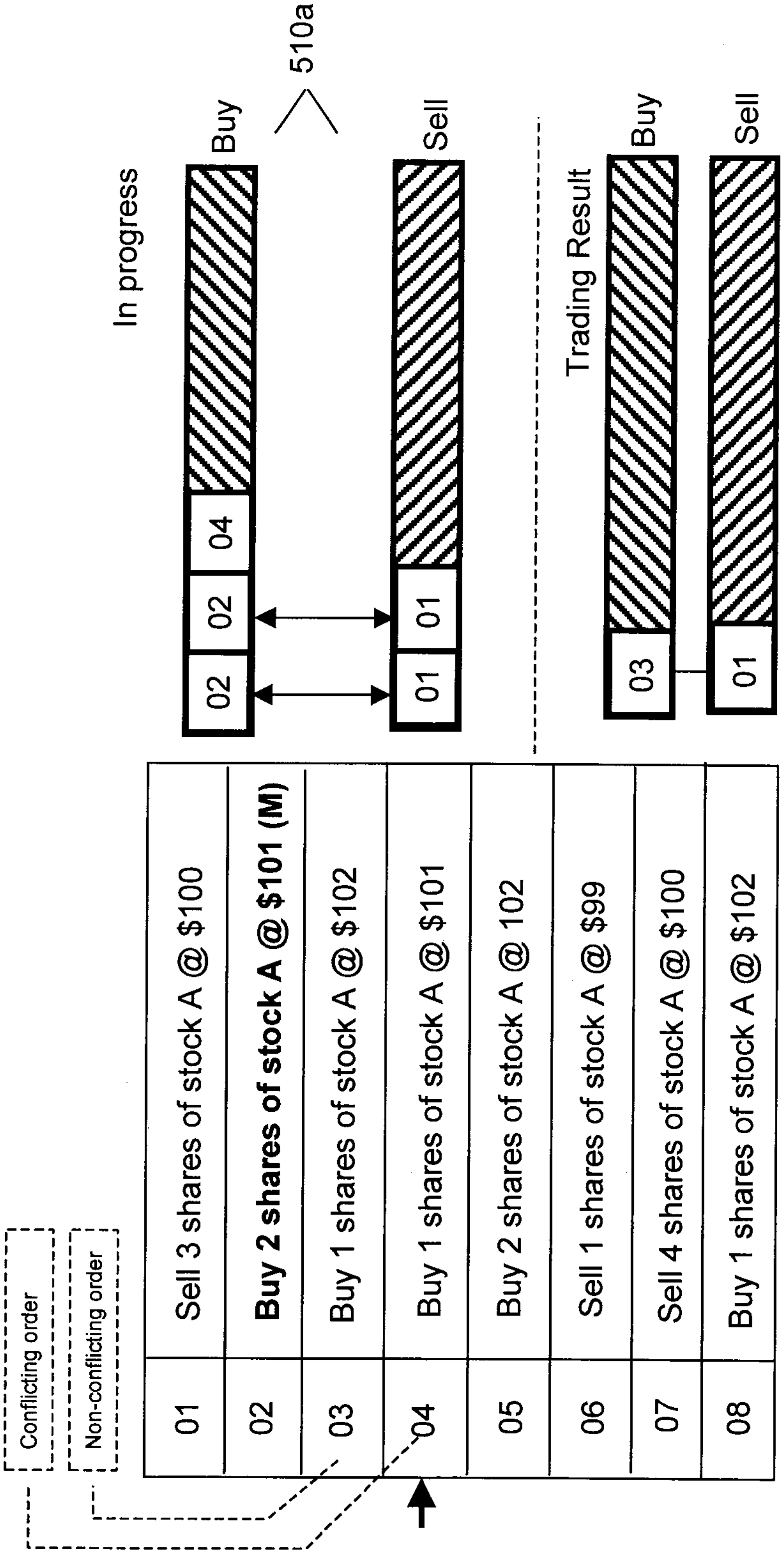
Figure 5F:
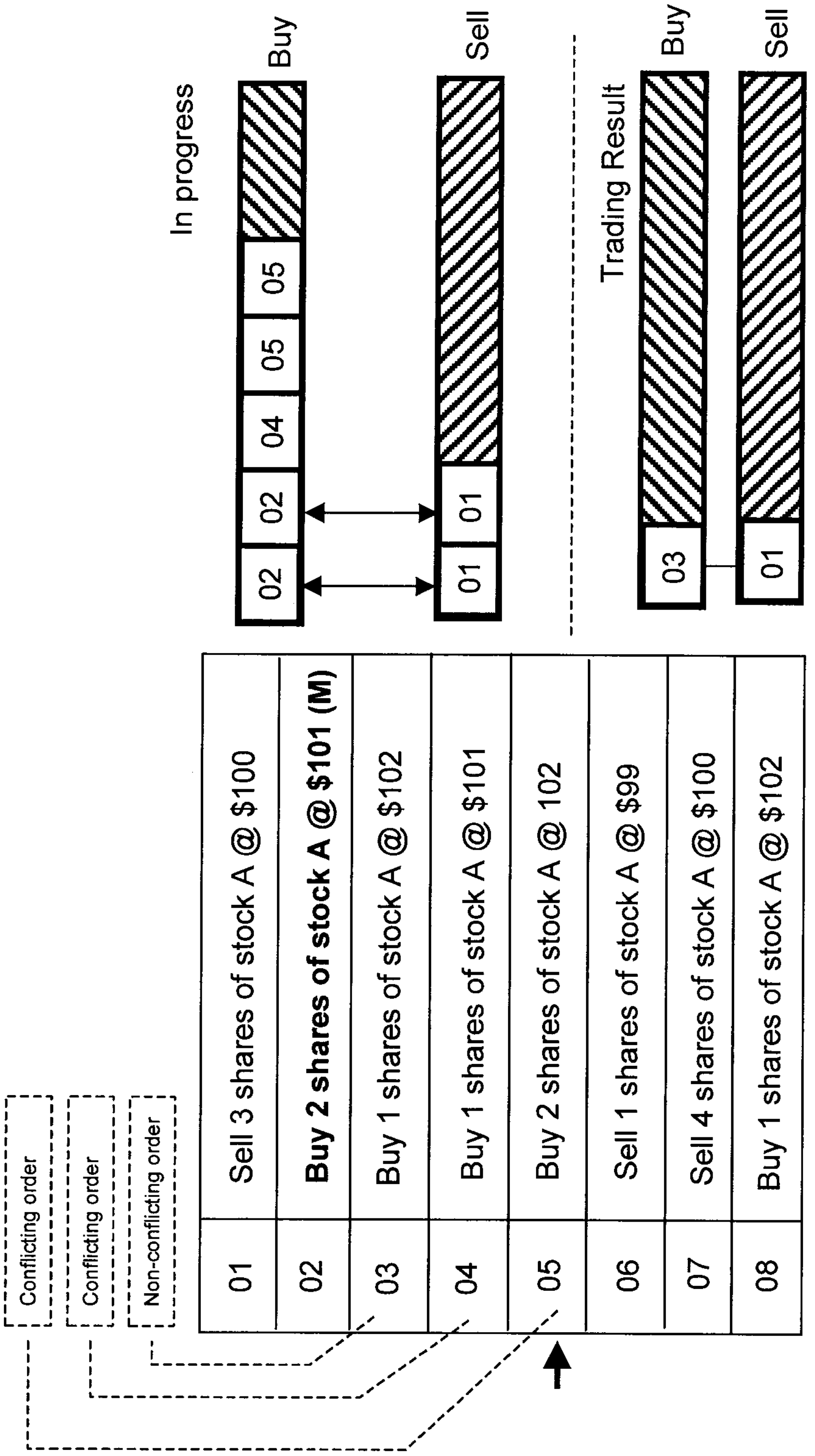

Referring now to FIG. 5E, the system receives a single-leg order 04: "Buy 1 share of stock A at $101". It will be recognized that because there is not enough quantity in the current system for both orders 01 and 04 (refer to in progress 510*a*), order 04 cannot get traded and is a conflicting order. Thus order 04 is blocked for the time being. It will be recognized that, referring now to FIG. 5F, if the system receives a single-leg order 05: "Buy 2 shares of stock A at price $102", it is a conflicting order for the same reason of order 04.

Figure 5G:
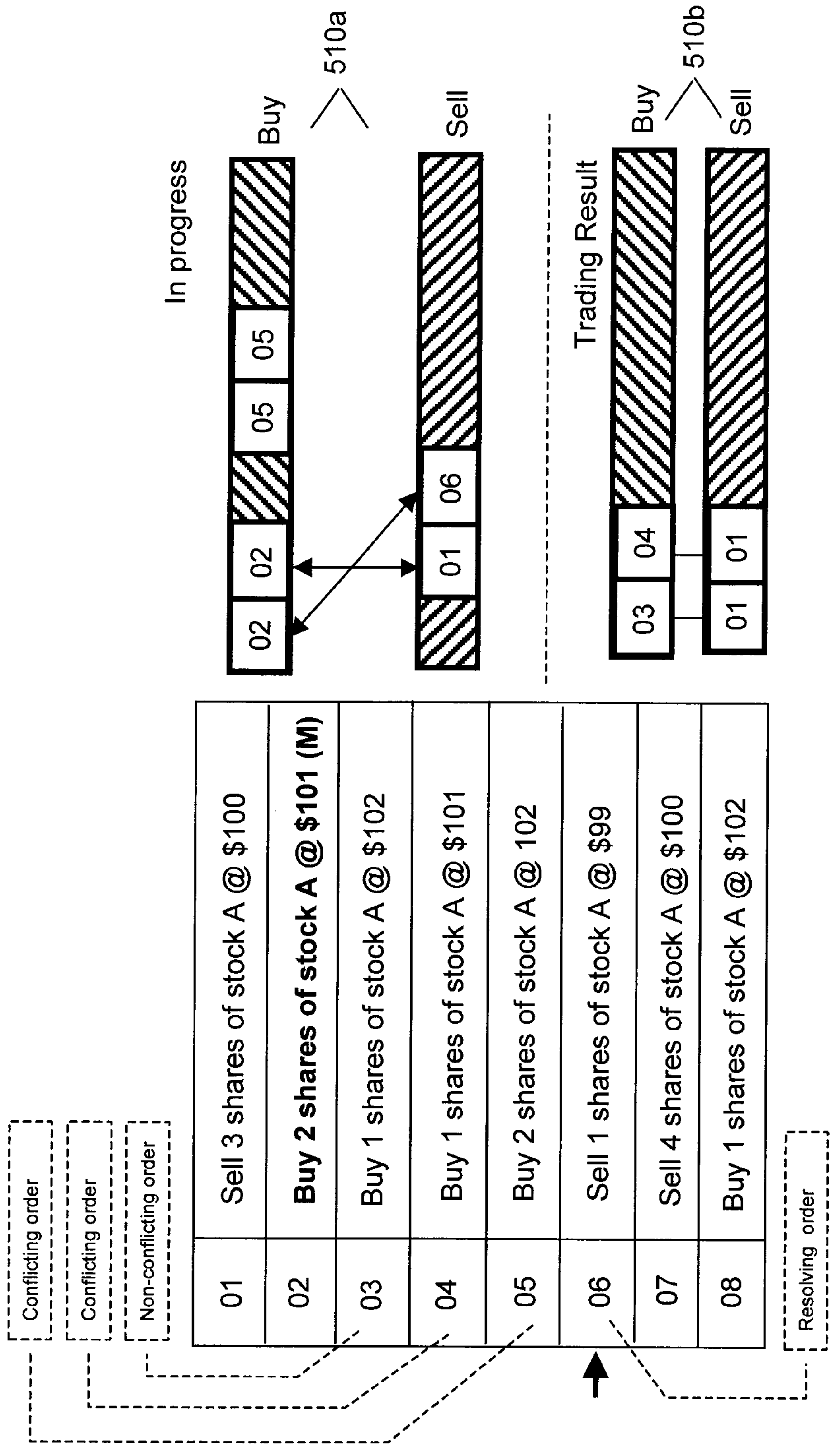

Referring now to FIG. 5G, the system receives a new order 06: "Sell 1 share of stock A at $99". Order 04 can trade with 1 share of order 01 (refer to trading result 510*b*), while order 02 can find its new match order 06 (refer to in progress 510*a*). Thus, order 06 is a resolving order that resolves order 04. Therefore, order 04 gets traded with order 01, and order 02 associates with order 06 as a new match (see in progress 510*a*).

Figure 5H:
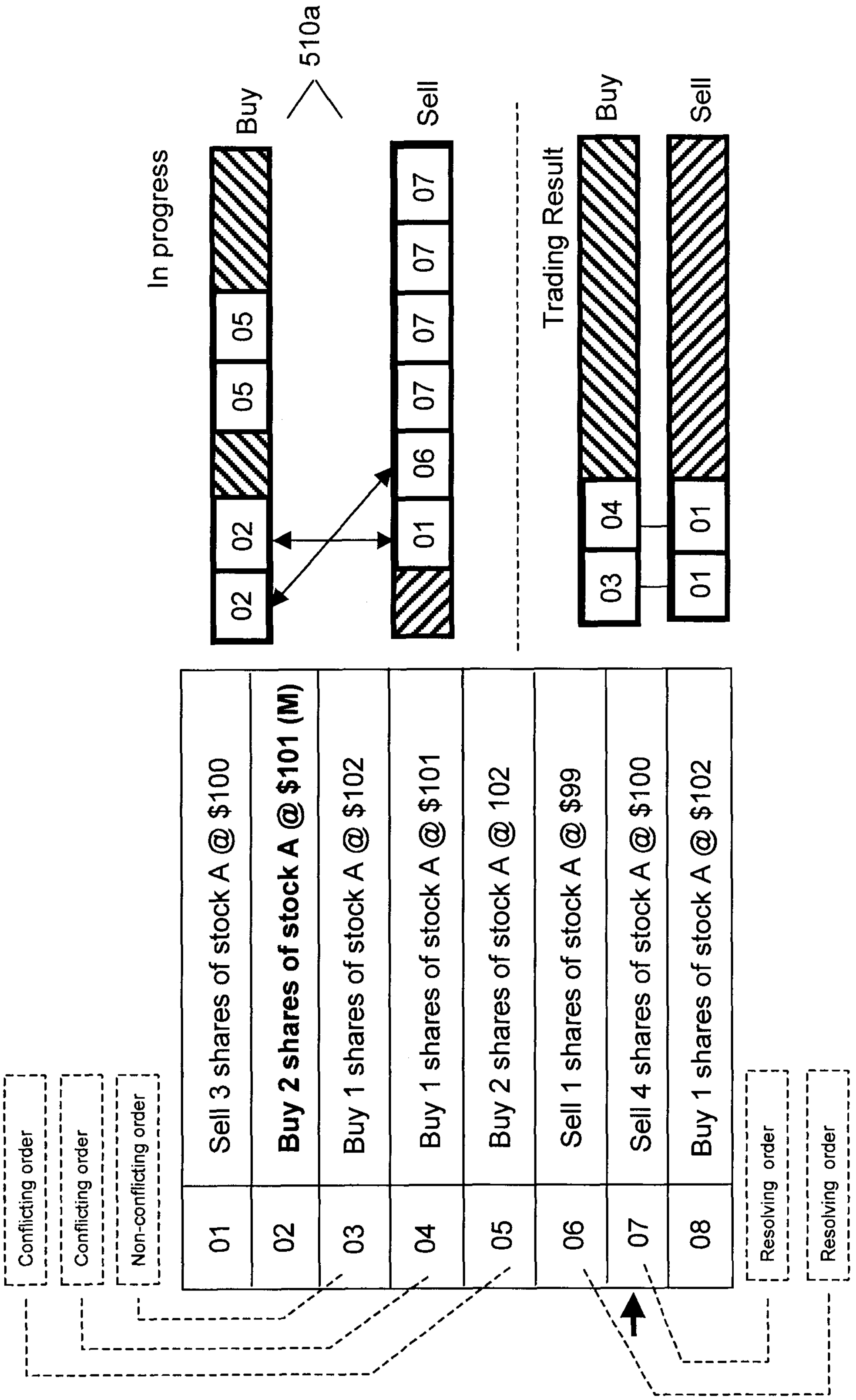
Figure 5I:
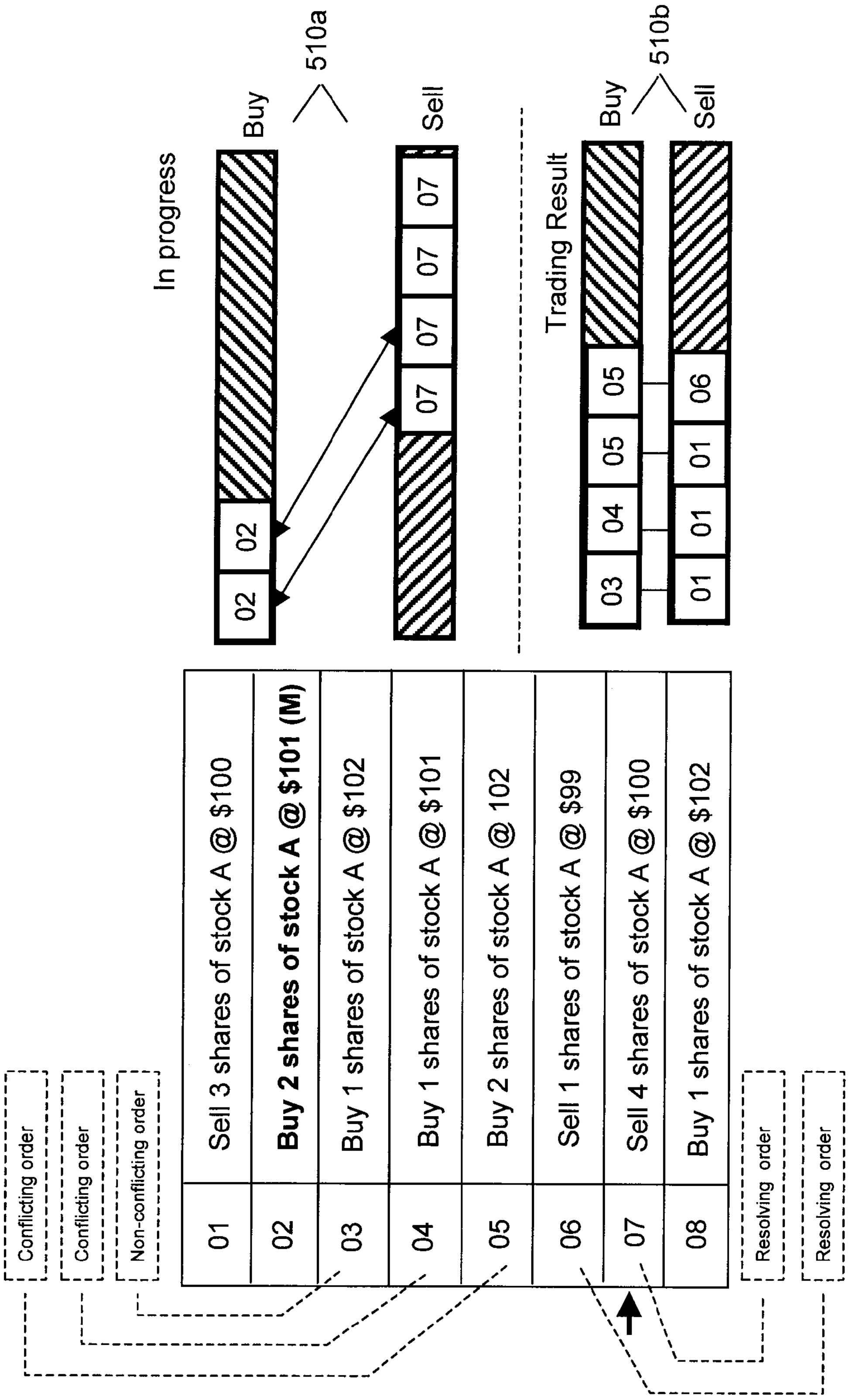

Referring now to FIG. 5H-I, the system receives a single-leg order 07: "sell 4 shares of stock A at $100". The order 07 sells are placed in progress 510*a*. Now, with the arrival of order 07, order 05 can trade with the remainder of order 01 and order 06, while order 02 can find its new match in order 07 (refer to in progress 510*a*). Thus, order 07 is a resolving order because order 05 gets traded with order 01 and order 06, whereas order 02 associates with order 07 as its new match (refer to book 510*b*, FIG. 5I).

Figure 5J:
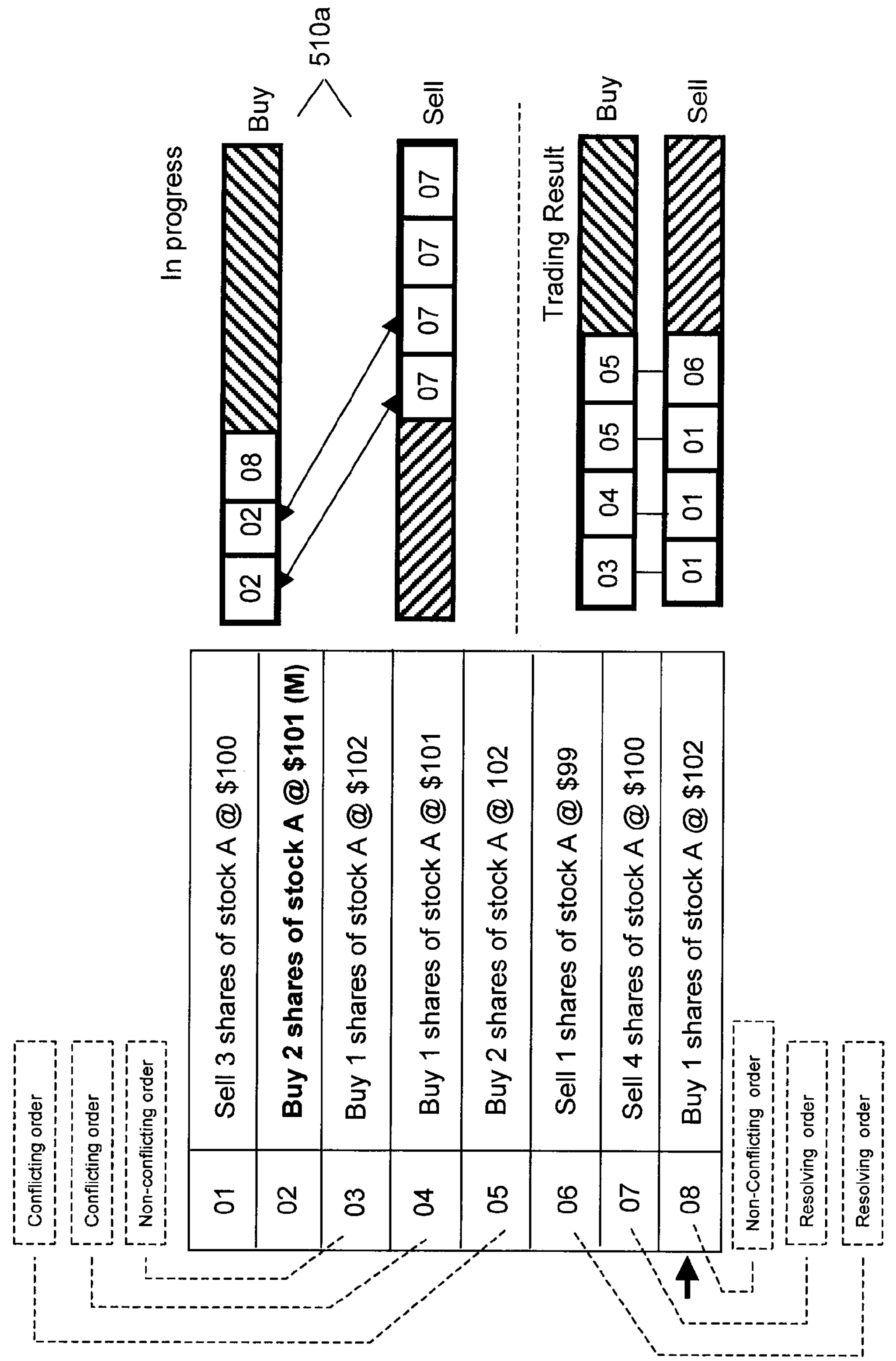
Figure 5K:
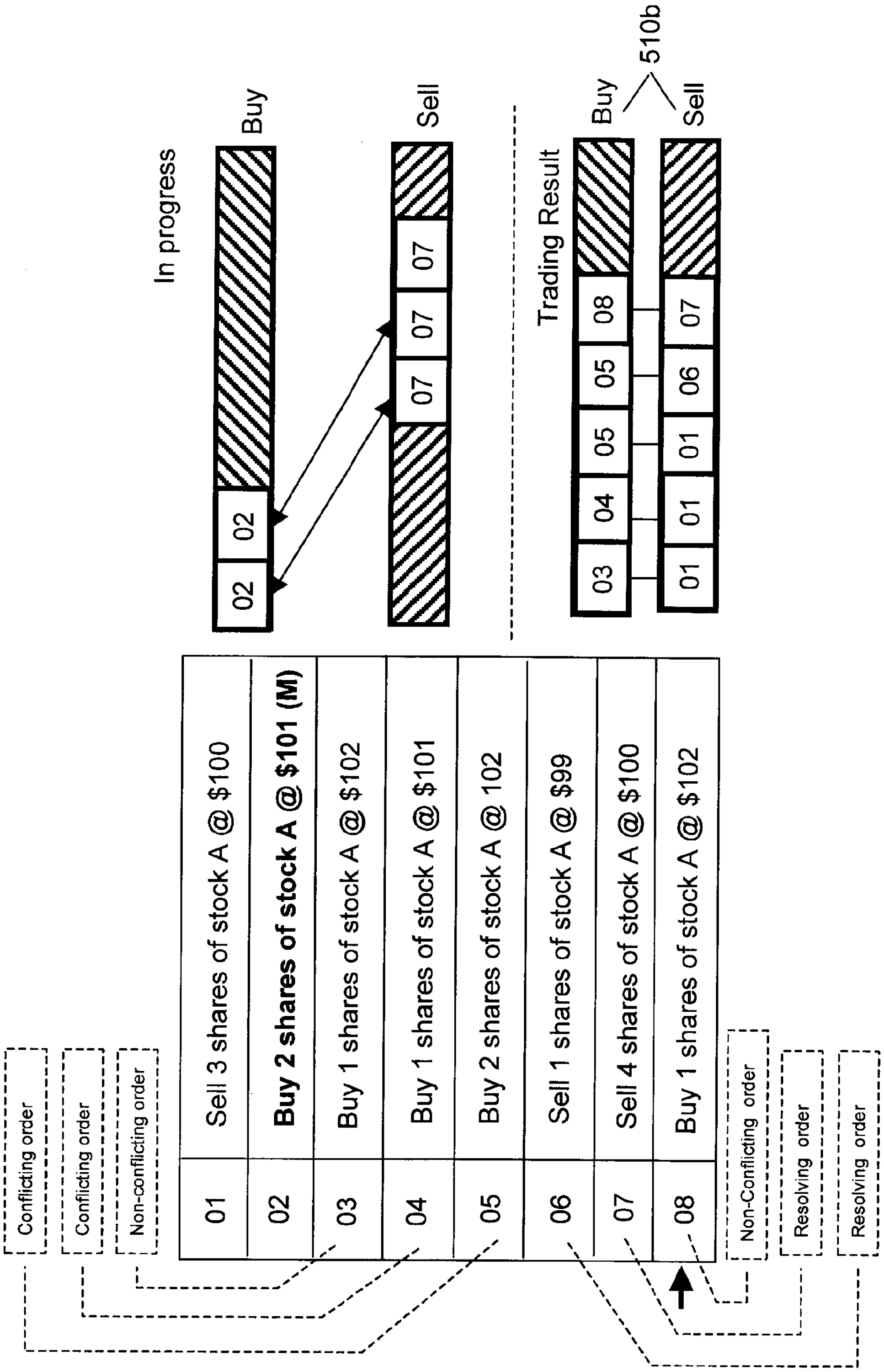

Referring now to FIG. 5J-K, the system receives a single-leg order 08: "buy 1 share of stock A at $ 102". Now, order 08 can be satisfied by order 07, while order 02 will not loose its match (refer to 510*a*). Thus, order 08 is a non-conflicting order and can be traded with order 05 (refer to 510*b*, FIG. 5K).

In the second case ("Case 2"), the optional constraint, discussed above regarding the first-come-first-handled rule, IS taken into consideration. The following definitions are presented for use in understanding multi-leg transaction processing according to an embodiment of the invention in Case 2:

1: Conflicting Order: this is either an order that has a match in the system, but if it gets traded, it will cause the blocked multi-leg order to be not tradable (an order that shares all or part of the same match with the blocked multi-leg order); or, an order that is at the opposite side of the blocked multi-leg order and cannot resolve all conflicting orders.

2. Non-conflicting Order: this is an order that does not have any match in the system (an order that will not affect any part of the blocked multi-leg order).

3. Resolving Order: this is an order with which the system can satisfy the blocked multi-leg order and all conflicting orders which are at the same side with the blocked multi-leg order, so that if all conflicting orders are let go at the same side with the blocked multi-leg order, the blocked multi-leg order can still find its match.

Figure 6:
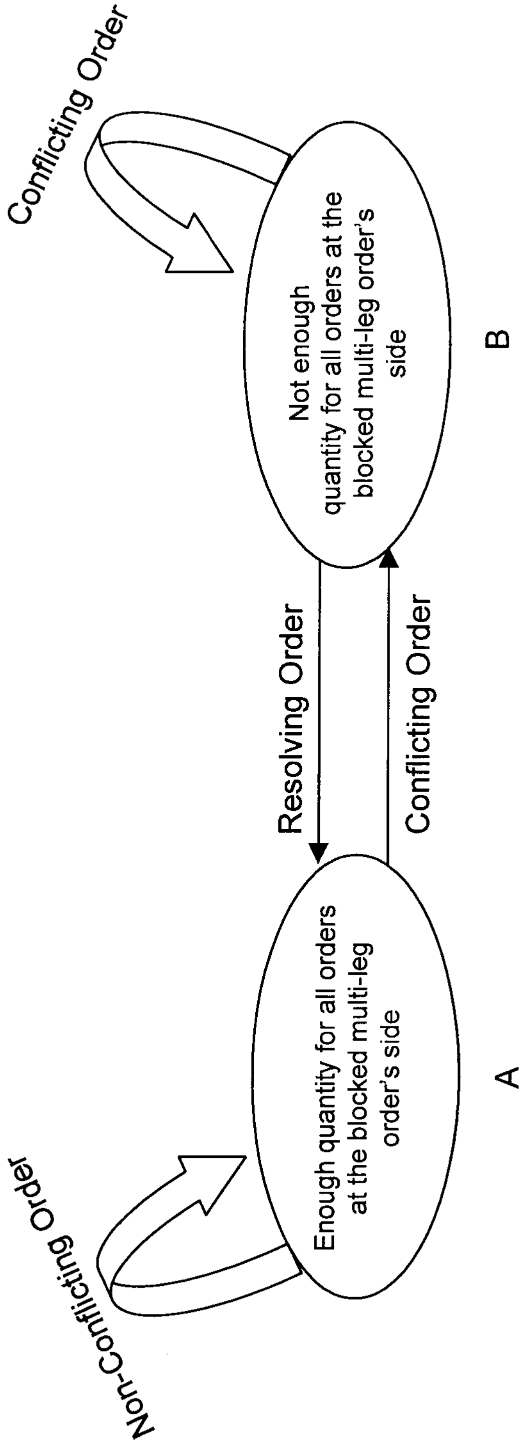
FIG. 6 illustrates a state machine for an exemplary Case 2 of multi-leg transaction processing according to an embodiment of the invention.

FIG. 6 illustrates a state machine for Case 2. In state A, there is enough quantity for all orders at the blocked multi-leg order's side. In state B, there is not enough quantity for all orders at the blocked multi-leg order's side. Thus, this differs from states A and B discussed in connection with FIG. 3. Here, the stricter optional constraint, discussed above regarding the first-come-first-handled rule, is observed such that a resolving order must resolve all orders on the multi-leg side.

Figure 7:
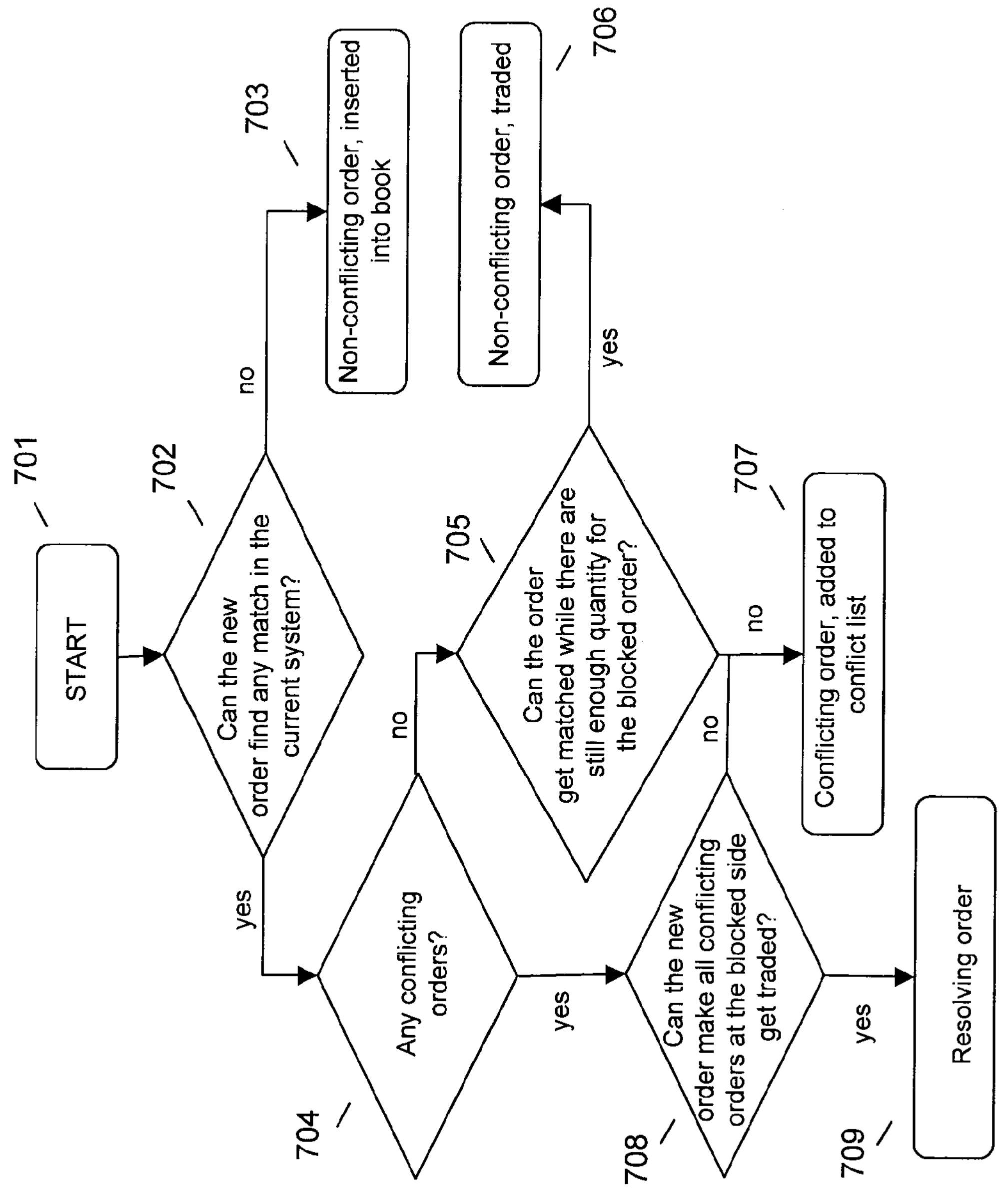
FIG. 7 illustrates an exemplary method for detecting/determining order types in Case 2 according to an embodiment of the invention.

FIG. 7 illustrates non-limiting and exemplary method for multi-leg transaction processing involving Case 2 according to an embodiment of the invention. As shown, the system receives a new order at 701. It is assumed that there is a pending multi-leg order. At 702, it is determined if the new order can find any match in the current system. If not, it is again deemed a non-conflicting order and is inserted into the book and will be processed. If there is a match determined at 702, it is determined if there are any conflicting orders at 704. If there are no conflicting orders, at 705 it is determined if the new order can be matched while there is still enough quantity for the blocked (multi-leg) order. If not, the new order is a conflicting order, and will be added to a conflict list and held by the system. If it is determined at 705 that there is enough quantity, the order is a non-conflicting order and is traded.

If it is determined at 704 that there are conflicting orders, at 708 it is determined if the new order can make all conflicting orders at the blocked side get traded. If not, the new order is again determined to be a conflicting order, and is added to a conflict list. If at 708 it is determined that the new order can make all the conflicting orders at the blocked side get traded, that is it can resolve all conflicts, it is determined to be a resolving order and is proposed to the coordinator along with the resolved orders as a block.

FIG. 8(A-E) provides a non-limiting example for handling Case 2 multi-leg transactions. The first five orders (01-05) are similar to Case 1, discussed herein, and will not be further described. Referring to FIG. 8A, the system gets a single-leg order 06: "Sell 1 share of stock A at price $99". In this case, if the system permits order 04 to trade with order 01, although order 02 can still find a match via order 01 (the remaining 1 share of order 01) and order 04, such trading will cause order 05 to be handled later than 06, violating the optional constraint (refer to in progress 710*a*). Therefore, by taking the optional constraint into consideration, order 06 is determined to be a conflicting order.

Referring to FIG. 8(B-C), the system receives a single-leg order 07: "sell 4 shares of stock A at $ 100". Now, orders 04 and 05 can be satisfied by orders 01 and 06, while order 02 will not loose its match, because order 07 will provide 4 additional shares (refer to in progress 710*a*). So, order 07 is a resolving order. Besides, orders 04, 05, and 06 can be handled in accordance with their arriving sequences, thus the optional constraint is not violated. Therefore, order 04 gets traded with order 01, order 05 gets trade with remaining order 01 and order 06 (refer to trading result 710*b*). Order 02 associates order 07 as its new match (refer to in progress 710*a*).

Figure 8A:
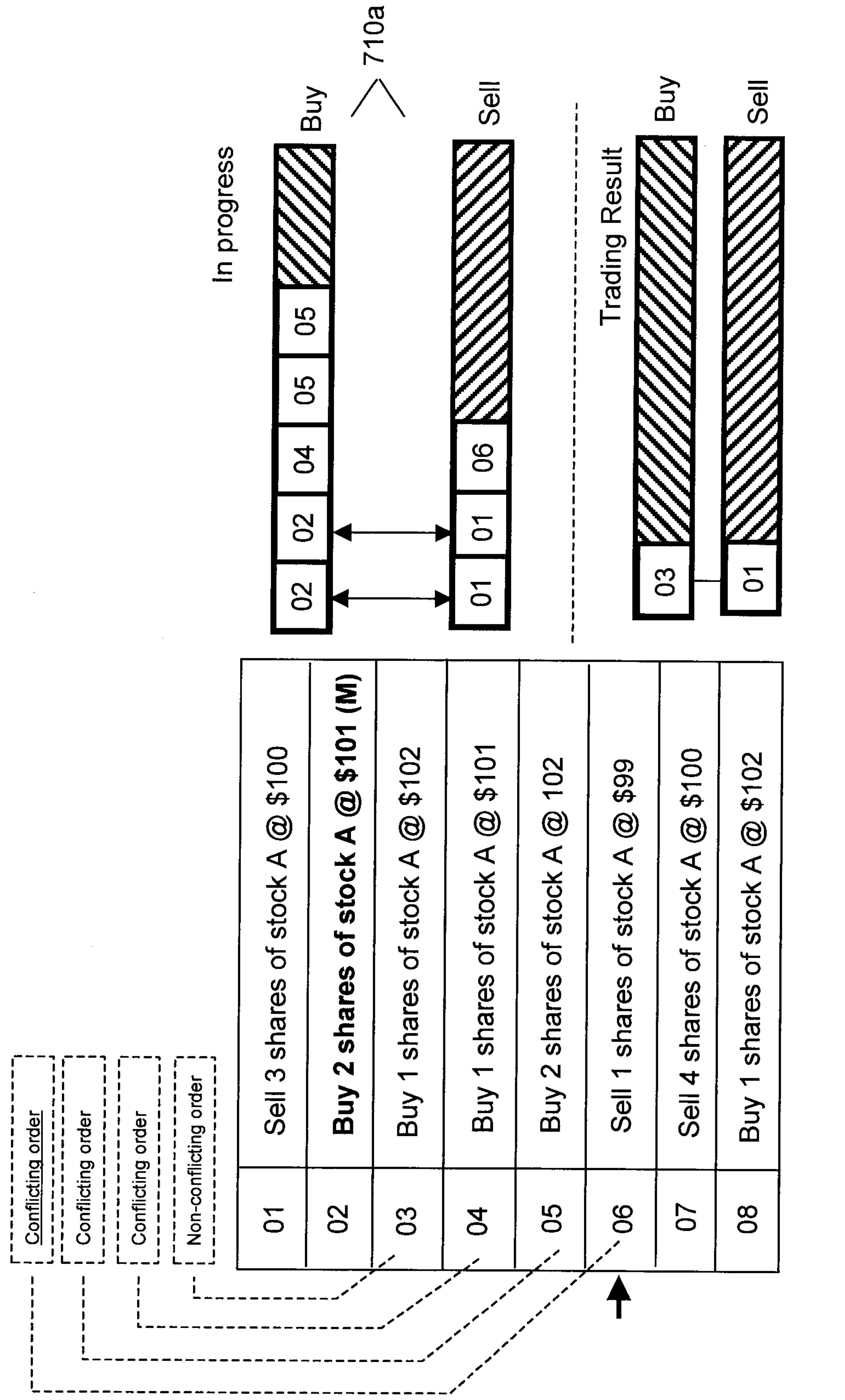
FIG. 8(A-E) illustrates an exemplary processing of transactions under Case 2 according to an embodiment of the invention.
Figure 8B:
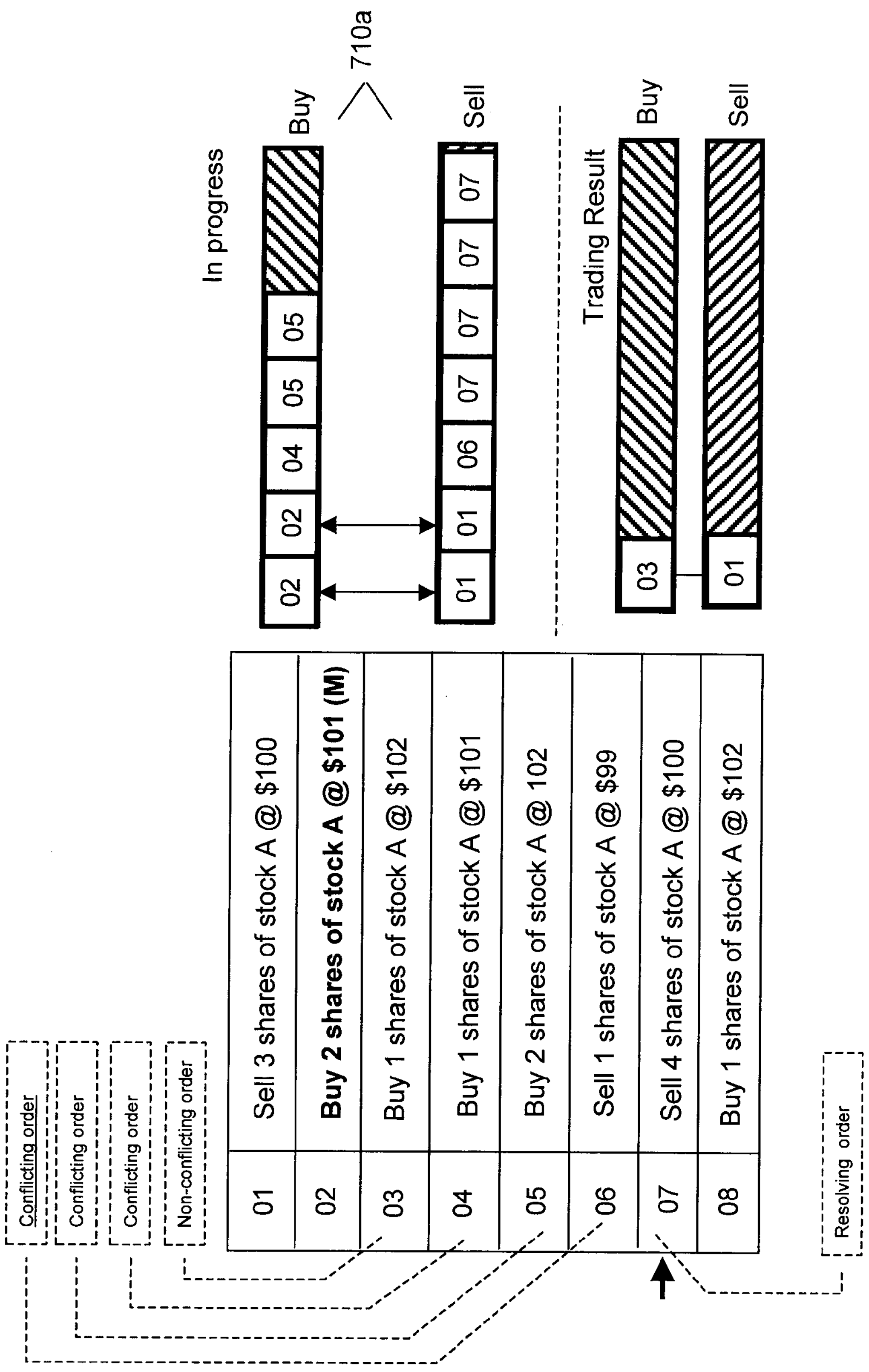
Figure 8C:
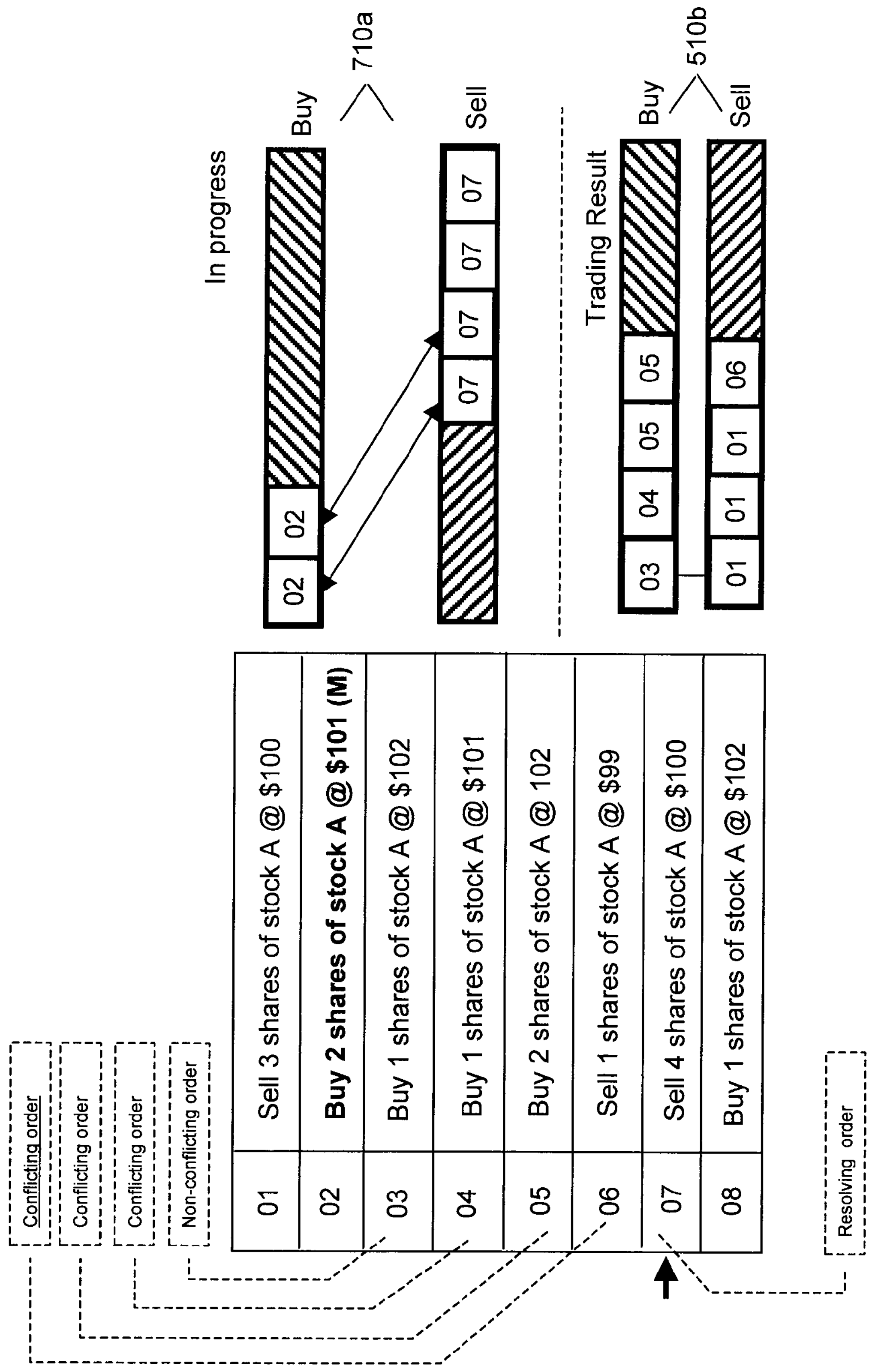
Figure 8D:
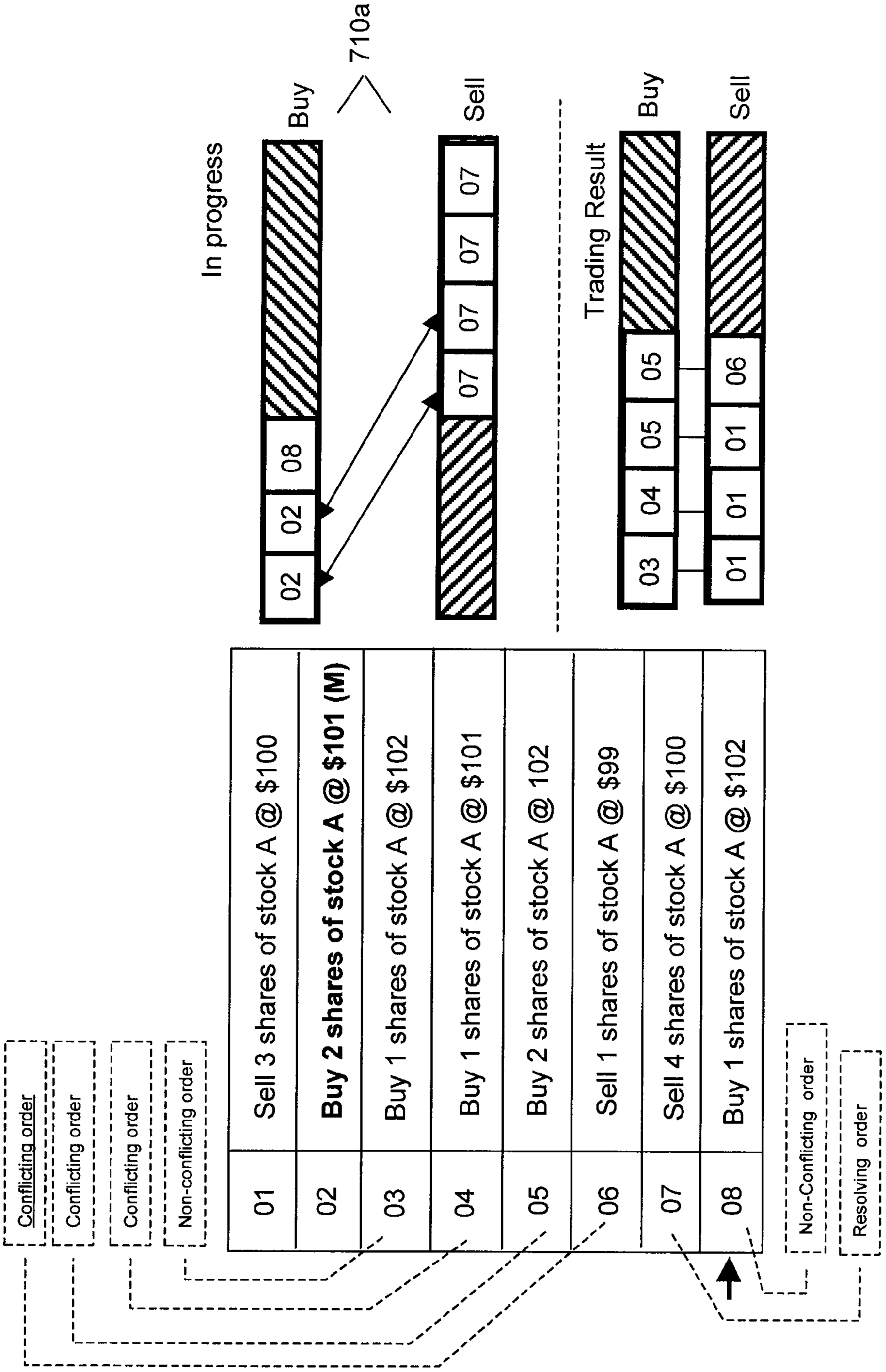
Figure 8E:
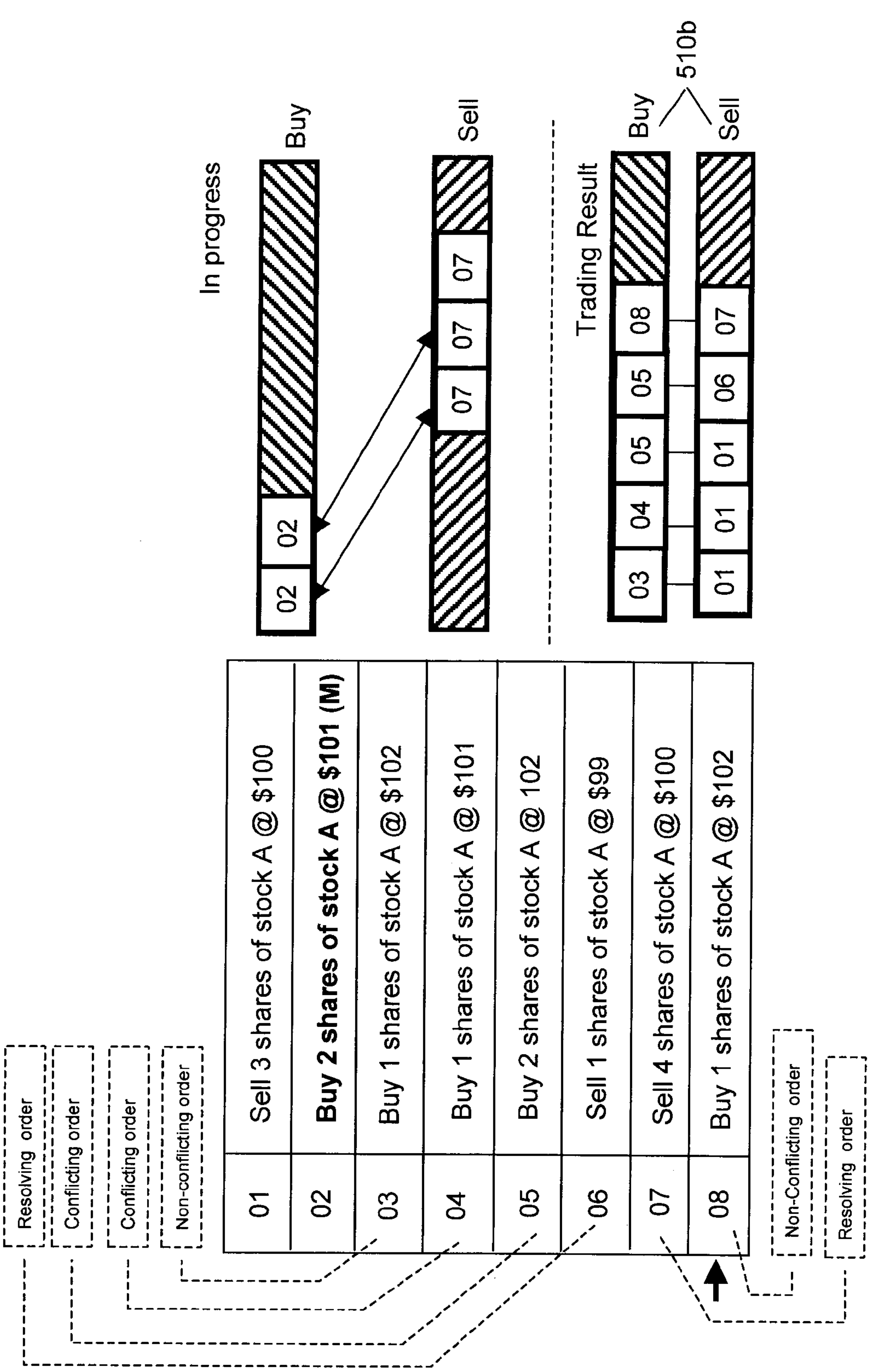

Referring now to FIG. 8D-E, the system receives a single-leg order 08: "buy 1 share of stock A at $ 102". Now, order 08 can be satisfied by order 07, while order 02 will not loose its match (refer to in progress, 810*a*, FIG. 8D). Thus, order 08 is a non-conflicting order. Moreover, orders 07 and order 08 can be handled in accordance with their arriving sequences and be traded (refer to trading result 810*b*, FIG. 8E).

Figure 9A:
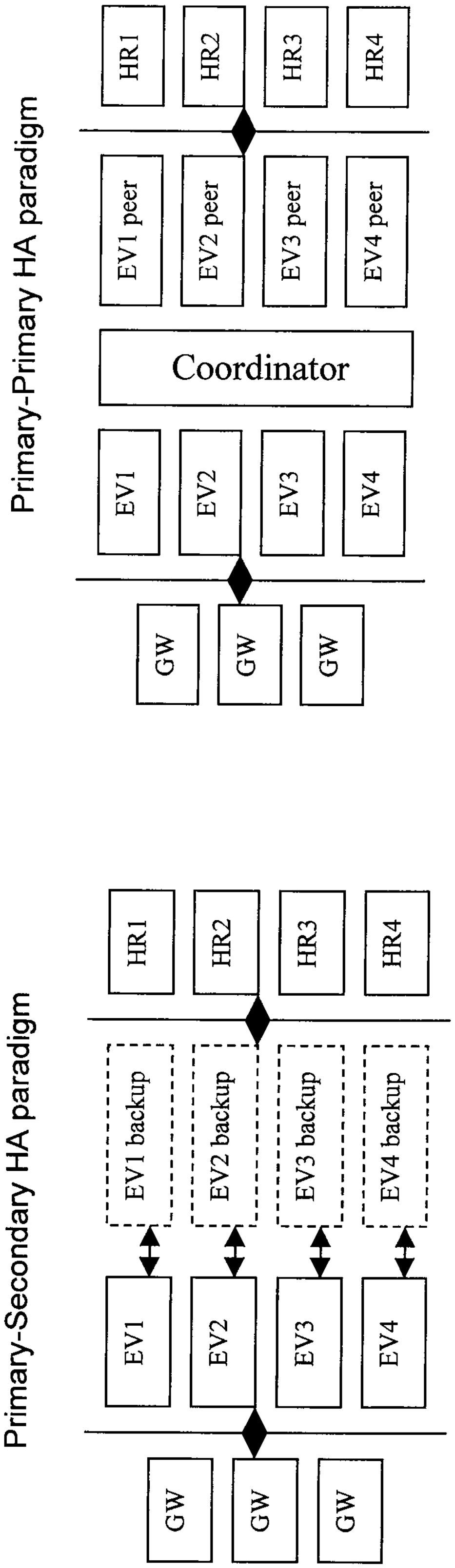
FIG. 9(A-C) illustrates an exemplary primary-primary HA multi-leg transaction processing system according to an embodiment of the invention.

FIG. 9A illustrates the primary-secondary and primary-primary HA paradigms. As shown, the primary-secondary HA paradigm utilizes exchange venues (EV1-EV4) which are backed up (EV1 backup), with history recorders (HR1-HR4) keeping track of the transactions. In contrast, the primary-primary HA paradigm utilizes multiple peers (for example EV1 and EV1 peer) situated about a centralized coordinator. The inventors have recognized that the main challenge for utilizing the primary-primary paradigm (which is more promising) for multi-leg transaction processing systems is that peers must process transactions in the same sequence (order).

In order to accomplish this, embodiments of the invention provide a global queue at a coordinator module for all peers. Before processing any single transaction, each peer proposes the transaction to the coordinator module for a position in the global queue. The coordinator module will either accept or reject the proposed queue position depending on the order type and detected dependencies, as discussed further herein. This facilitates proper ordering of transaction processing, particularly where the look-ahead mechanism is employed to minimize blocking by a pending multi-leg transaction. Moreover, the coordinating module is useful for shuffling transaction orders in cases where peers' local queues do not match.

Figure 9B:
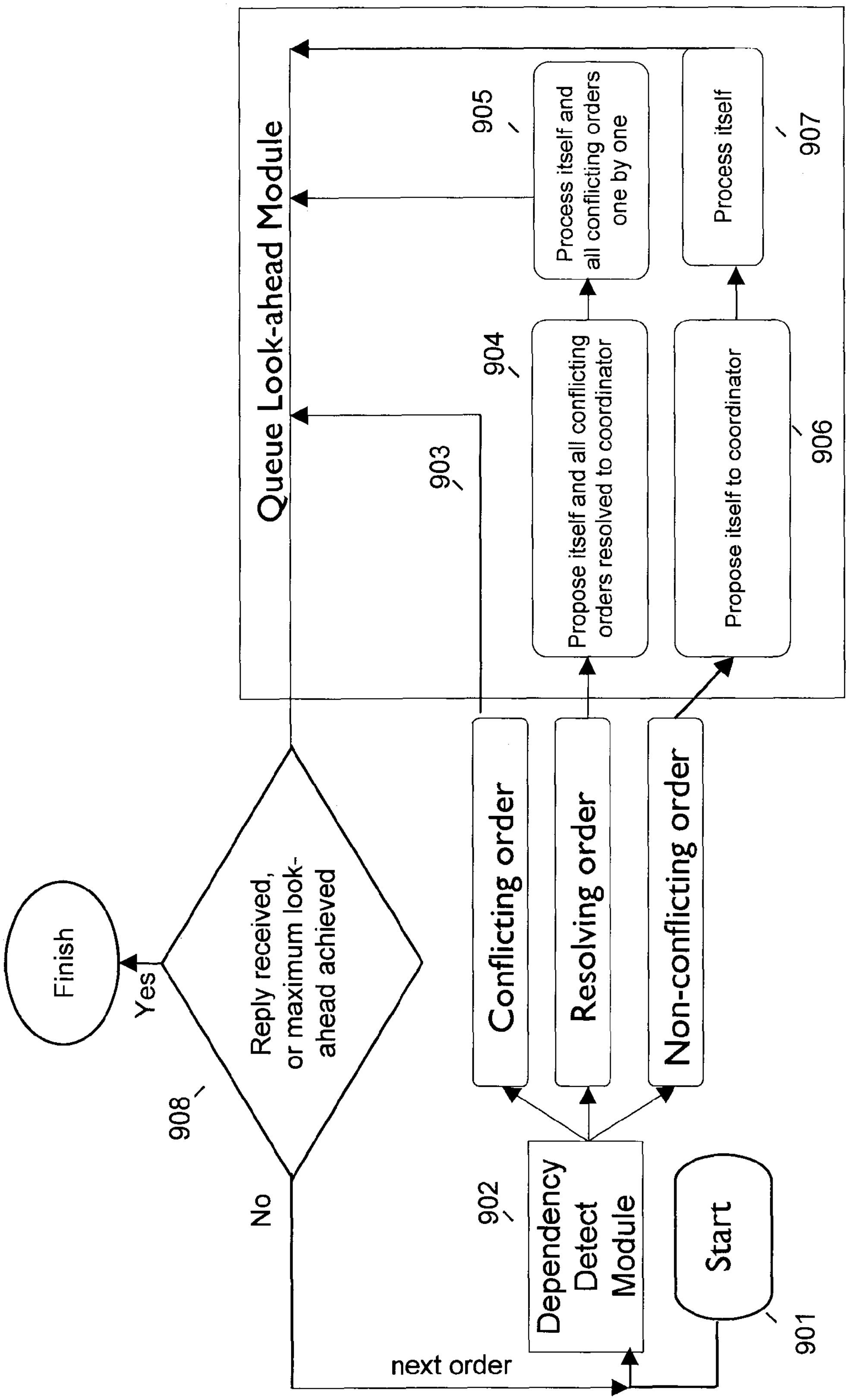

FIG. 9B illustrates processing flow in a primary-primary HA transaction processing system according to an embodiment of the invention. As illustrated in FIG. 9B, the process starts at 901 when a new order is received. A dependency detect module determines the order type at 902, as discussed herein. If it is determined that the order is a conflicting order, at 903 a look ahead queue module is employed in an attempt to discover a resolving order for further processing. Further processing of conflicting orders is held until the blocking multi-leg order receives its reply or a resolving order is obtained.

If it is determined that the order is a resolving order, the resolving order proposes itself and all conflicting orders (that are resolved) to the coordinator module as a block for processing at 904. These orders will be processed at 905 one-by-one. It should be noted that the coordinator module will chose the order of transactions that is most efficient for the system as proposed by one or more of the peers. The coordinator module will accept the proposed ordering of transactions such that a resolving order and all conflicting orders it resolves are processed one by one without violating timing rules.

If it is determined that the order is a non-conflicting order, the order proposes itself to the coordinator module at 906 and will be processed at 907. Accordingly, embodiments of the invention enable utilization of a primary-primary HA paradigm systems for multi-leg transaction processing.

Figure 9C:
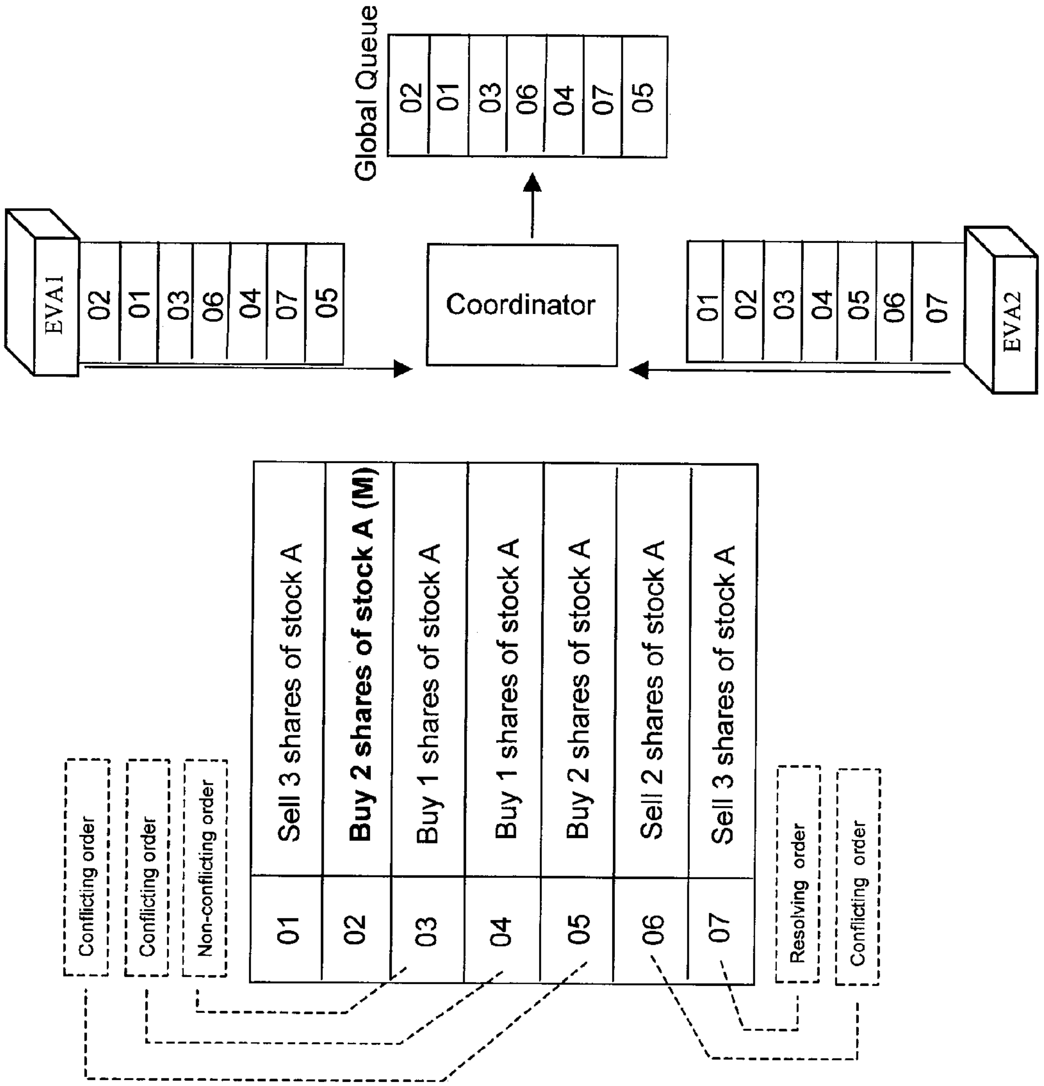

As illustrated in FIG. 9C, the exchange venue peers (EVA1, EVA2) may propose different transaction processing orders to the coordinator. In FIG. 9C, exchange venue A1 (EVA1) proposes a transaction processing order (02, 01, 03, 06, 04, 07, 05) to the coordinator. Exchange venue A1 (EVA2) also proposes a transaction processing order (01, 02, 03, 04, 05, 06, 07) to the coordinator. As shown, the multi-leg transaction (03) creates a potential block for the orders, as orders 04, 05 and 06 are conflicting orders. However, EVA1 proposes an order that presents the resolving order (07) and the orders it resolves (01, 03, 04, 05 and 06) as a re-ordered block that preserves the exchange timing rules (for example the "first-come-first-serve" rule for the single leg orders) and allows continued processing of subsequent transactions during the multi-leg transaction's (03) waiting time. Accordingly, the accepted global queue that the peers will follow is 02, 01, 03, 06, 04, 07, 05. This is the order processing that will be followed by the peers.

In brief recapitulation, embodiments of the invention provide for multi-leg transaction processing with significant reduction in blocking time via utilization of a look-ahead mechanism. Again, although non-limiting and exemplary preferred embodiments of the invention have been described with reference to stock trading, it will be readily understood that various embodiments of the invention can be implemented to form a system that handles a wide variety of multi-leg transactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "service," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, to special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

utilizing one or more processors to execute program instructions configured to:

receive at a queue one or more multi-leg transaction requests;

look-ahead in the queue to identify one or more resolving transaction requests from transaction requests queued after receipt of the one or more multi-leg transaction requests if the one or more multi-leg transaction requests cannot complete, the one or more resolving transaction requests representing a match with one or more blocked transactions having a conflicting order with the one or more multi-leg transaction requests; and wherein said identifying one or more resolving transaction requests comprises identifying the one or more resolving transaction requests which can be traded according to one or more trading rules;

in response to identifying the one or more resolving transaction requests, process the one or more blocked transactions and the one or more resolving transaction requests during a waiting period of the one or more multi-leg transaction requests without losing a match with an order for the one or more multi-leg transaction requests, wherein the one or more blocked transactions are queued after the receipt of the one or more multi-leg transaction requests and are blocked due to the one or more multi-leg transaction requests not being able to complete.

2. The method according to claim 1, wherein the one or more resolving transaction requests resolve the one or more blocked transactions.

3. The method according to claim 1, wherein the program instructions are further configured to process, during said waiting period, one or more non-conflicting transaction requests queued after the one or more multi-leg transaction requests.

4. The method according to claim 1, wherein the program instructions are further configured to hold one or more conflicting transaction requests until the waiting period of the one or more multi-leg transaction requests has expired or the one or more resolving transaction requests have been identified.

5. The method according to claim 1, wherein:

the transaction requests comprise one or more of stock buy orders and stock sell orders;

the one or more multi-leg transaction requests comprise one or more of a stock buy order and a stock sell order for at least a first stock type and a second stock type; and the one or more blocked transaction requests comprise one or more of a stock buy order and a stock sell order for the first stock type.

6. The method according to claim 5, wherein:

the first stock type is handled by a first execution venue; and the second stock type is handled by a second execution venue.

7. The method according to claim 1, wherein the queue comprises a global queue re-ordered with respect to one or more peer queues in a primary-primary high availability paradigm system.

8. The method according to claim 7, wherein the global queue is re-ordered in response to a determination that one or more queued transaction requests must be re-ordered with respect to the one or more peer queues to process the one or more blocked transactions during the waiting period of the one or more multi-leg transaction requests.

9. A system comprising:

one or more modules comprising one or more processors configured to execute program instructions, the program instructions comprising computer readable program code configured to:

receive at a queue one or more multi-leg transaction requests;

look-ahead in the queue to identify one or more resolving transaction requests from transaction requests queued after receipt of the one or more multi-leg transaction requests if the one or more multi-leg transaction requests cannot complete, the one or more resolving transaction requests representing a match with one or more blocked transactions having a conflicting order with the one or more multi-leg transaction requests;

wherein said identifying one or more resolving transaction requests comprises identifying the one or more resolving transaction requests which can be traded according to one or more trading rules; and in response to identifying the one or more resolving transaction requests, process the one or more blocked transactions and the one or more resolving transaction requests during a waiting period of the one or more multi-leg transaction requests without losing a match with an order for the one or more multi-leg transaction requests, wherein the one or more blocked transactions are queued after the receipt of the one or more multi-leg transaction requests and are blocked due to the multi-leg transaction request not being able to complete.

10. The system according to claim 9, wherein the one or more resolving transaction requests resolve the one or more blocked transactions.

11. The system according to claim 9, wherein the computer readable program code is further configured to:

process, during said waiting period, one or more non-conflicting transaction requests queued after the one or more multi-leg transaction requests.

12. The system according to claim 9, wherein the computer readable program code is further configured to:

hold one or more conflicting transaction requests until the waiting period of the one or more multi-leg transaction requests has expired or the one or more resolving transaction requests have been identified.

13. The system according to claim 9, wherein:

the transaction requests comprise one or more of stock buy orders and stock sell orders;

the one or more multi-leg transaction requests comprise one or more of a stock buy order and a stock sell order for at least a first stock type and a second stock type; and the one or more blocked transactions comprise one or more of a stock buy order and a stock sell order for the first stock type.

14. The system according to claim 13, wherein:

the first stock type is handled by a first execution venue; and the second stock type is handled by a second execution venue.

15. The system according to claim 9, wherein the queue comprises a global queue re-ordered with respect to on one or more peer queues in a primary-primary high availability paradigm system.

16. The system according to claim 15, wherein the global queue is re-ordered in response to a determination that one or more queued transaction requests must be re-ordered with respect to the one or more peer queues to process the one or more blocked transaction requests during the waiting period of the one or more multi-leg transaction requests.

17. A computer program product comprising a non-transitory computer readable memory having computer readable program code embodied therewith, the computer readable program code being configured to:

receive at a queue one or more multi-leg transaction requests;

look-ahead in the queue to identify one or more resolving transaction requests from transaction requests queued after receipt of one or more multi-leg transaction requests if the one or more multi-leg transaction requests cannot complete, the one or more resolving transaction requests representing a match with one or more blocked transactions having a conflicting order with the one or more multi-leg transaction requests; and wherein said identifying one or more resolving transaction requests comprises identifying the one or more resolving transaction requests which can be traded according to one or more trading rules;

in response to identifying the one or more resolving transaction requests, process the one or more blocked transactions and the one or more resolving transaction requests during a waiting period of the one or more multi-leg transaction requests without losing a match with and order for the one or more multi-leg transaction requests, wherein the one or more blocked transactions are queued after the receipt of the one or more multi-leg transaction requests and are blocked due to the one or more multi-leg transaction requests not being able to complete.

18. The computer program product according to claim 17, wherein:

the transaction requests comprise one or more of stock buy orders and stock sell orders;

the one or more multi-leg transaction requests comprise one or more of a stock buy order and a stock sell order for at least a first stock type and a second stock type; and the one or more blocked transactions comprise one or more of a stock buy order and a stock sell order for the first stock type.

19. The computer program product according to claim 17, wherein:

the first stock type is handled by a first execution venue; and the second stock type is handled by a second execution venue.

20. The computer program product according to claim 18, wherein the queue comprises a global queue re-ordered with respect to on one or more peer queues in a primary-primary high availability paradigm system.

21. The computer program product according to claim 20, wherein the global queue is re-ordered in response to a determination that one or more queued transaction requests must be re-ordered with respect to the one or more peer queues to process the one or more blocked transactions during the waiting period of the one or more multi-leg transaction requests.

22. A method for handling trade for buying and selling orders of different types comprising:

utilizing one or more processors to execute program instructions configured to:

receive a plurality of buy and sell orders comprised of at least one multi-leg order for multiple types, wherein the at least one multi-leg order is for a multi-leg order (m1) for type A and type B, wherein the m1 can trade for type A but has not yet been cleared for trading type B; and handle at least one order for type A received after m1 using a lookahead algorithm, the lookahead algorithm acting to identify one or more resolving transactions requests representing a match with a conflicting order, wherein the one or more resolving transactions are at least one order for type A, wherein said lookahead algorithm comprises identifying at least one order of type A received after m1 which can be traded according to one or more trading rules, and executing the at least one order for type A while m1 remains blocked; and in response to identifying the one or more resolving transaction requests, process one or more blocked transactions and the one or more resolving transaction requests during a waiting period of the one or more multi-leg transaction requests without losing a match with an order for the one or more multi-leg transaction requests, wherein the one or more blocked transactions are blocked due to the multi-leg transaction request not being able to complete.

23. The method of claim 22, wherein said one or more trading rules include a rule indicating that an order to buy X1 shares of an item at price Y1 can be satisfied if an order to sell X2 shares of the item at price Y2 exists, where X2 is greater than or equal to X1 and Y1 is greater than or equal to Y2.

* * * * *